(12) United States Patent
Ishii

(10) Patent No.: US 8,422,383 B2
(45) Date of Patent: Apr. 16, 2013

(54) BASE STATION APPARATUS AND COMMUNICATION CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 536 days.

(21) Appl. No.: 12/529,166

(22) PCT Filed: Feb. 26, 2008

(86) PCT No.: PCT/JP2008/053320
§ 371 (c)(1),
(2), (4) Date: Nov. 19, 2009

(87) PCT Pub. No.: WO2008/105420
PCT Pub. Date: Sep. 4, 2008

(65) Prior Publication Data
US 2010/0074128 A1    Mar. 25, 2010

(30) Foreign Application Priority Data

Mar. 1, 2007  (JP) ................................ 2007-052112
May 1, 2007  (JP) ................................ 2007-121301

(51) Int. Cl.
*H04J 3/14* (2006.01)
(52) U.S. Cl.
USPC ......................................... 370/252; 370/329
(58) Field of Classification Search ........................ None
See application file for complete search history.

(56) References Cited

U.S. PATENT DOCUMENTS

| | | | | |
|---|---|---|---|---|
| 7,664,523 B2* | 2/2010 | Kaneko et al. | ................ | 455/522 |
| 7,873,007 B2* | 1/2011 | Kim et al. | ..................... | 370/329 |
| 7,986,959 B2* | 7/2011 | Malladi et al. | ................ | 455/522 |
| 7,995,515 B2* | 8/2011 | Thesling | ....................... | 370/322 |

(Continued)

FOREIGN PATENT DOCUMENTS

| JP | 2000-134136 A | 5/2000 |
|---|---|---|
| JP | 2006-067002 A | 3/2006 |

(Continued)

OTHER PUBLICATIONS

Ericsson, HARQ-ARQ Interactions for NACK® ACK error, 3GPP TSG-RAN WG2 #56bis, T-doc R2-070059, Sorrento, Italy, Jan. 15-19, 2007, 7 pages.

(Continued)

*Primary Examiner* — Kevin C Harper
*Assistant Examiner* — Rhonda Murphy
(74) *Attorney, Agent, or Firm* — Osha Liang LLP

(57) ABSTRACT

A base station apparatus for communicating to a mobile station over an uplink shared channel includes a transmit instruction unit configured to assign an uplink shared channel to the mobile station and instruct the mobile station to conduct transmissions over the assigned uplink shared channel; a measurement unit configured to measure a radio quality of the assigned uplink shared channel; and a determination unit configured to determine based on the radio quality whether the mobile station has transmitted data over the assigned uplink shared channel. In addition, a communication control method at a base station apparatus for communicating to a mobile station over an uplink shared channel includes assigning an uplink shared channel to the mobile station and instructing the mobile station to conduct transmissions over the assigned uplink shared channel; measuring a radio quality of the uplink shared channel assigned to the mobile station; and determining based on the radio quality whether the mobile station has transmitted data over the assigned uplink shared channel.

9 Claims, 17 Drawing Sheets

U.S. PATENT DOCUMENTS

| | | | |
|---|---|---|---|
| 2003/0012195 | A1 | 1/2003 | Ohkubo et al. |
| 2007/0110064 | A1 | 5/2007 | Ohkubo et al. |
| 2008/0123583 | A1 | 5/2008 | Shiizaki et al. |
| 2008/0280638 | A1* | 11/2008 | Malladi et al. ............... 455/522 |
| 2009/0325619 | A1 | 12/2009 | Aiba et al. |
| 2010/0027450 | A1* | 2/2010 | Montojo et al. ............. 370/311 |
| 2011/0034177 | A1 | 2/2011 | Oh et al. |
| 2011/0159870 | A1 | 6/2011 | Hamada |

FOREIGN PATENT DOCUMENTS

| | | | |
|---|---|---|---|
| JP | 2006-352705 A | 12/2006 | |
| WO | 0178324 A1 | 10/2001 | |
| WO | 2006/007317 A1 | 1/2006 | |
| WO | 2006070465 A1 | 7/2006 | |

OTHER PUBLICATIONS

3GPP Organization Partners, 3rd Generation Partnership Project; Technical Specification Group Radio Access Network; "Physical layer procedures," 3GPP TS 36.213 v0.2.1, Oct. 2006, 12 pages.

LG Electronics Inc., "Impact of ACK to NACK signalling error," 3GPP TSG RAN WG2 #56bis, T-doc R2-070262, Riga, Latvia, Nov. 6-10, 2006, 3 pages.

Patent Abstracts of Japan, Publication No. 2000-134136, dated May 12, 2000, 1 page.

3GPP TR 25.814 V7.0.0, Jun. 2006, Physical layer aspects for evolved Universal Terrestrial Radio Access (UTRA), 126 pages.

International Search Report issued in PCT/JP2008/053320, mailed on May 27, 2008, with translation, 9 pages.

Written Opinion issued in PCT/JP2008/053320, mailed on May 27, 2008, 4 pages.

Japanese Office Action for Application No. 2009-501253, mailed on Aug. 7, 2012 (4 pages).

Japanese Office Action for Application No. 2009-501254, mailed on Sep. 11, 2012 (4 pages).

Patent Abstracts of Japan for Japanese Publication No. 2006-352705, publication date Dec. 28, 2006 (1 page).

Patent Abstracts of Japan for Japanese Publication No. 2006-067002, publication date Mar. 9, 2006 (1 page).

Japanese Office Action for Application No. 2009-501254, mailed on Nov. 20, 2012 (2 pages).

esp@cenet Patent Abstract for WO 0178324, publication date Oct. 18, 2001. (1 page).

* cited by examiner

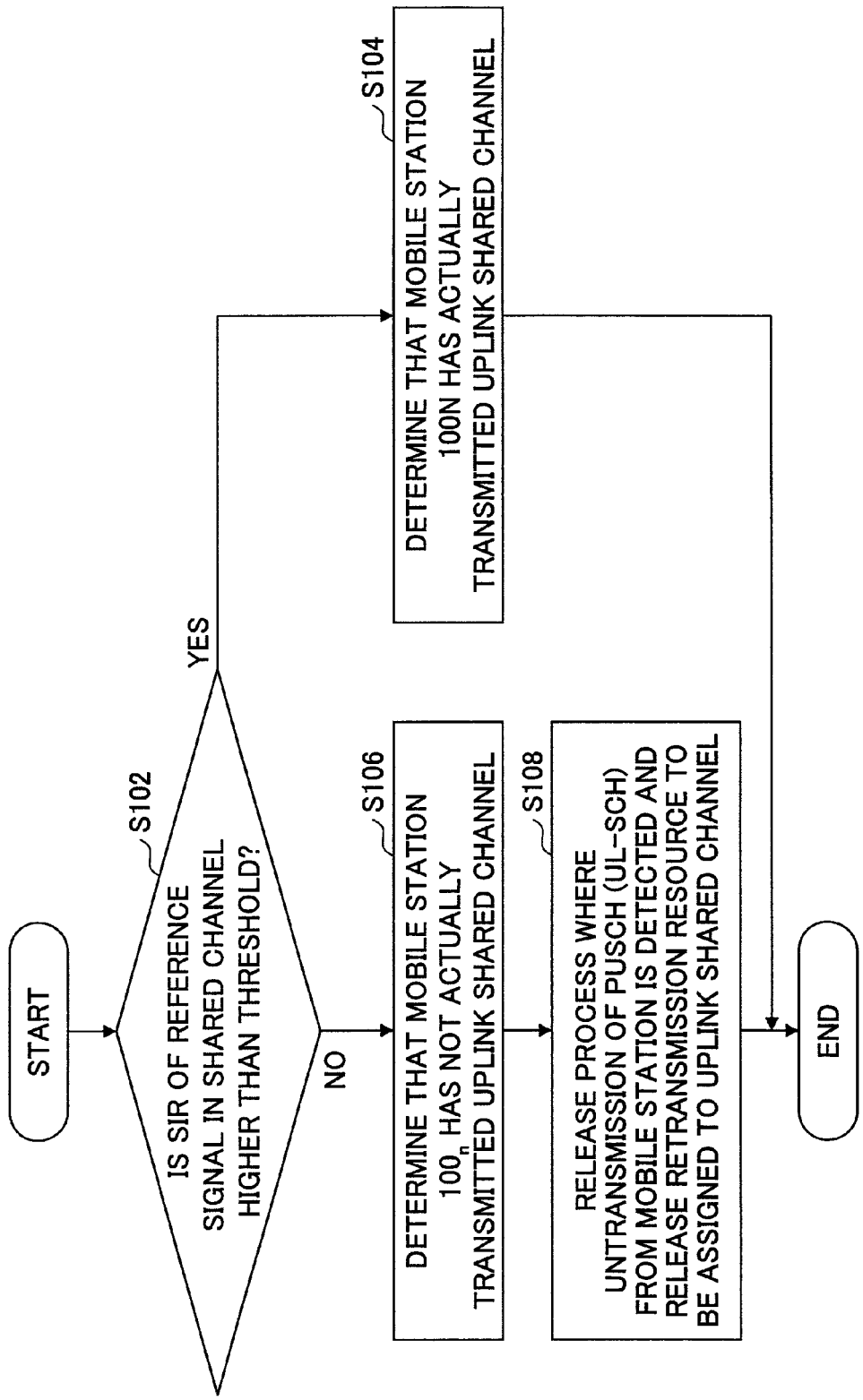

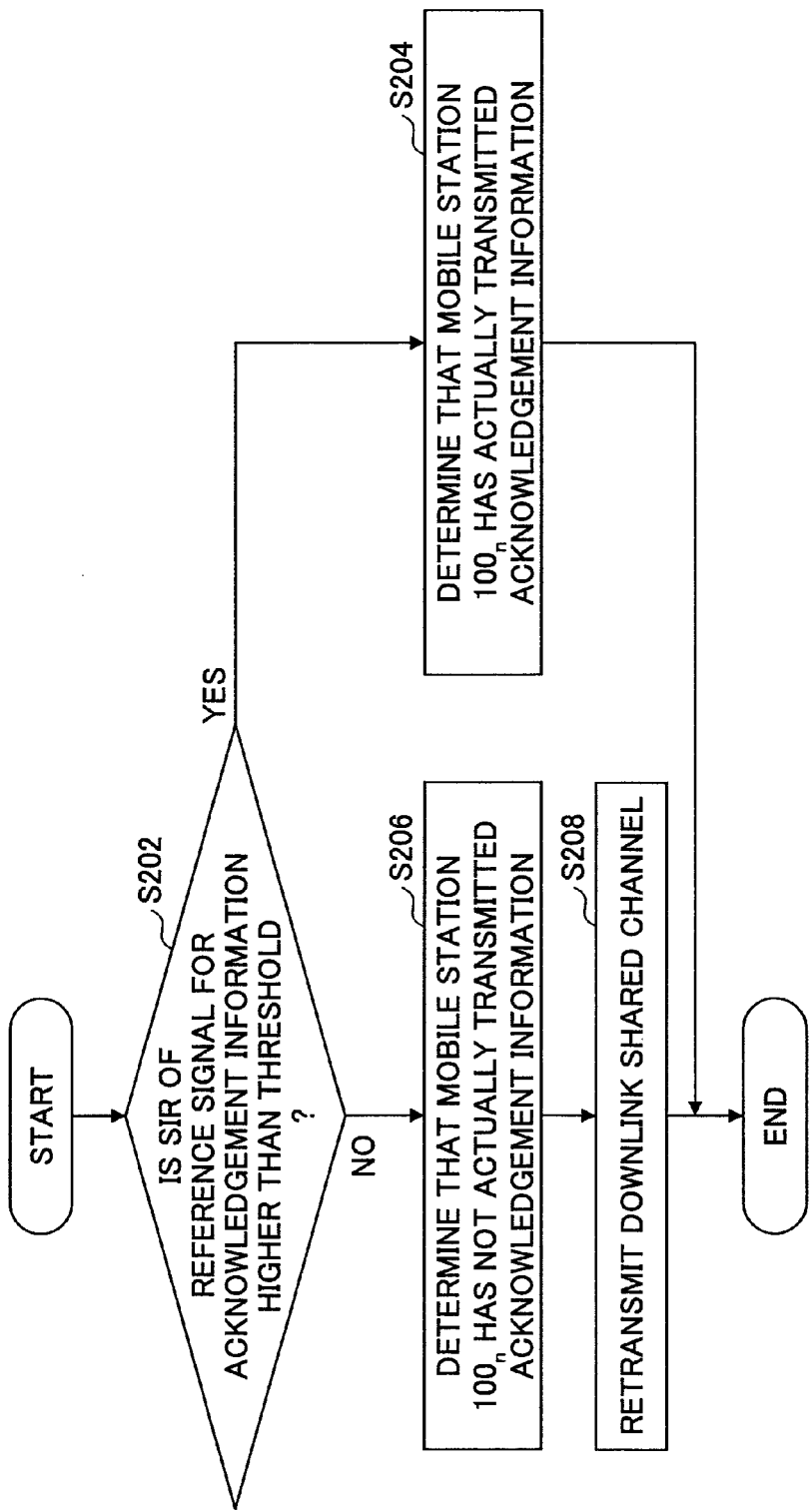

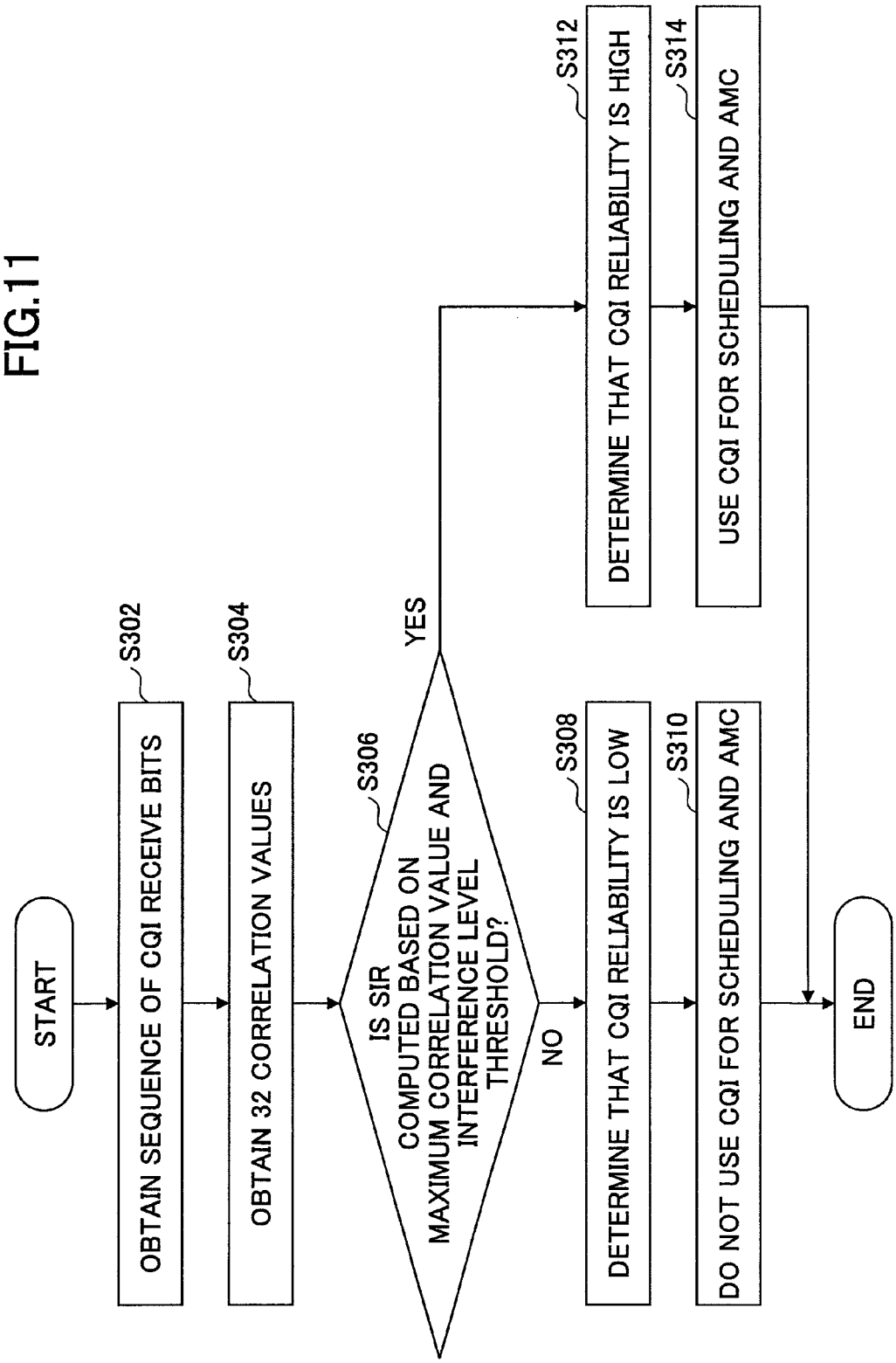

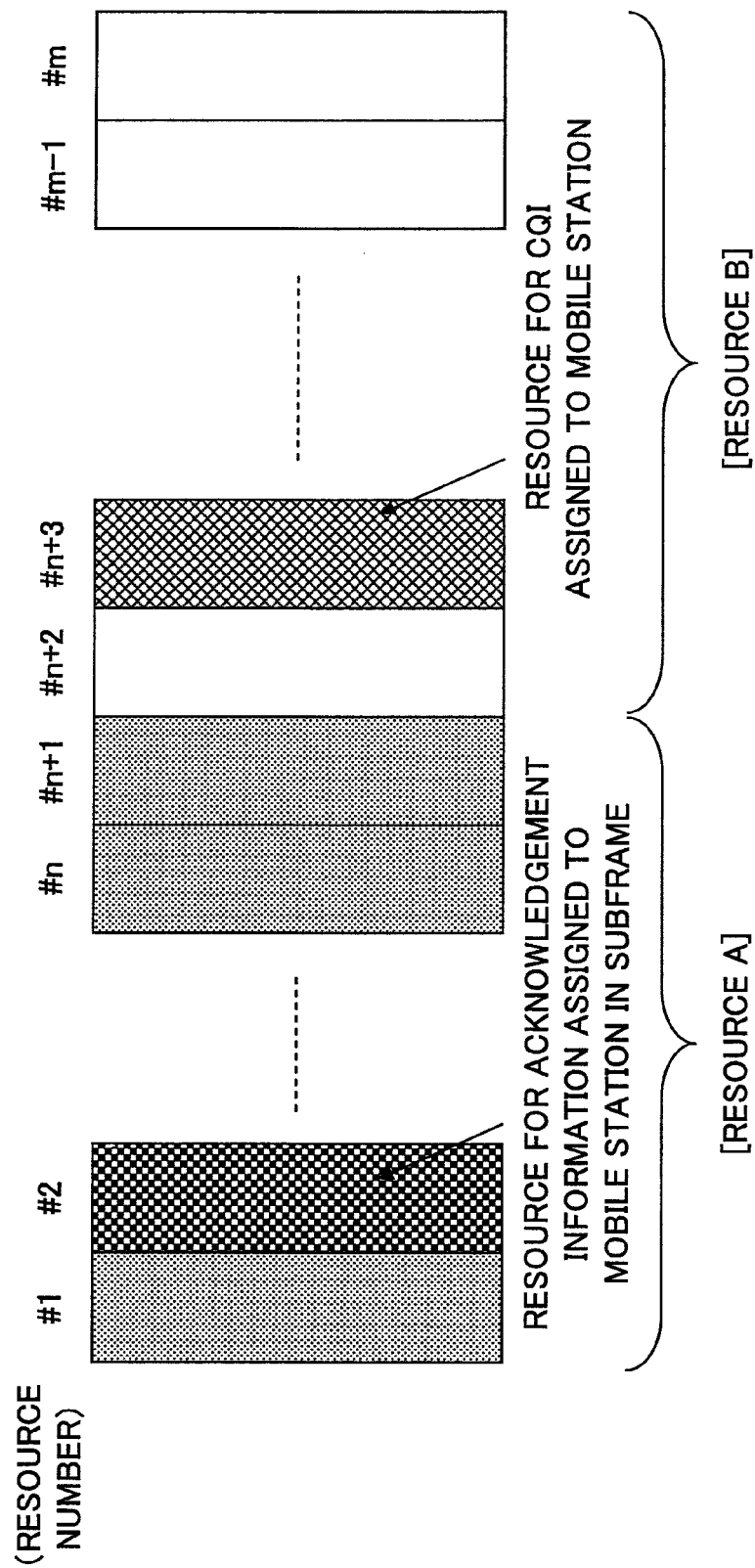

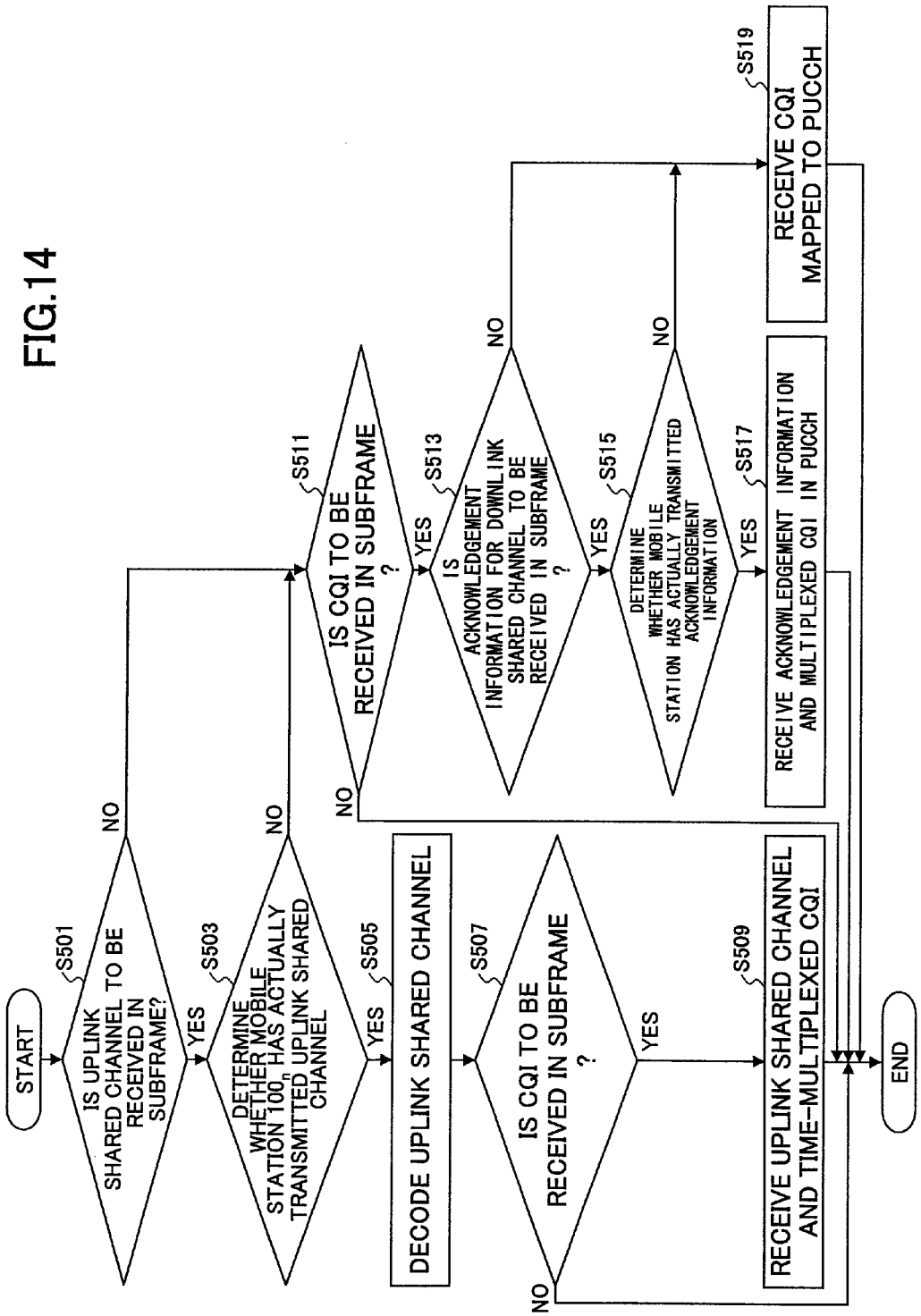

BASE STATION APPARATUS AND COMMUNICATION CONTROL METHOD

TECHNICAL FIELD

The present invention relates to base station apparatuses and communication control methods to which OFDM (Orthogonal Frequency Division Multiplexing) is applied in downlinks.

BACKGROUND ART

A communication scheme serving as a successor of W-CDMA and HSDPA, that is, a LTE (Long Term Evolution) system has been and is being discussed by a W-CDMA standardization organization 3GPP. In the LTE system, an OFDM scheme and a SC-FDMA (Single-Carrier Frequency Division Multiple Access) scheme are being investigated as downlink and uplink radio access schemes, respectively. See 3GPP TR 25.814 (V7.0.0), "Physical Layer Aspects for Evolved UTRA", June 2006, for example.

In the OFDM scheme, a frequency band is segmented into multiple smaller frequency bands (subcarriers), and data is carried and transmitted over the individual subcarriers. According to the OFDM scheme, the subcarriers are densely arranged on the frequency band in such a manner that the subcarriers are partially overlapped with each other without mutual interference, resulting in fast transmission and highly efficient utilization of the frequency band.

In the SC-FDMA scheme, a frequency band is segmented, and different frequency bands are used among multiple terminals for transmission, resulting in reduced interference among the terminals. According to the SC-FDMA scheme, variations in transmit power are reduced, resulting in lower power consumption for the terminals and wider coverage.

The above-mentioned LTE system uses shared channels in uplinks and downlinks. For example, in uplink, a base station apparatus selects mobile stations to communicate to the base station apparatus using the shared channel for each subframe (each 1 ms) and uses downlink control channels to instruct the selected mobile stations to communicate over the shared channel in certain subframes. The mobile stations transmit the shared channels in accordance with the downlink control channels. The base station apparatus receives and decodes the shared channels transmitted from the mobile stations. The above-mentioned selection of mobile stations to communicate over the shared channels is called as scheduling.

Also, AMC (Adaptive Modulation and Coding) is applied to the LTE system, and thus different transmission formats for the shared channels are used for different subframes. The transmission formats may include assignment information of resource blocks, which corresponds to frequency resources, modulation schemes, payload sizes, HARQ related information such as redundancy version parameters and process numbers, and/or MIMO related information such as reference signal sequences for MIMO application, for example.

In the LTE, identification information of the mobile stations communicating over the shared channels in the subframes and the transmission formats of the shared channels are transmitted over physical downlink control channels (PD-CCHs). The PDCCH may be also referred to as DL L1/L2 control channels.

In a MAC layer of the LTE, HARQ (Hybrid Automatic Repeat reQeust) is applied in both uplinks and downlinks. For example, the mobile stations transmit acknowledgement information in uplinks based on CRC check results of DL-SCH. The base station apparatus controls retransmissions depending on the acknowledgement information. The acknowledgement information is represented as either of a positive response (ACK) indicating that transmitted signals have been successfully received or a negative response (NACK) indicating that the transmitted signals have not been successfully received. Also, the base station apparatus transmits acknowledgement information in downlinks based on CRC check results of UL-SCH. The mobile station controls retransmission depending on the acknowledgement information. The acknowledgement information is represented as either of a positive response (ACK) indicating that transmitted signals have been successfully received or a negative response (NACK) indicating that the transmitted signals have not been successfully received.

DISCLOSURE OF INVENTION

Problem to be Solved by the Invention

In the above-mentioned scheduling and HARQ operations, if PDCCHs for transmitting the identification information of mobile stations communicating over uplink shared channels and transmission formats for the shared channels are erroneously decoded at a mobile station, the mobile station may not transmit the uplink shared channels. On the other hand, the base station apparatus reserves the uplink shared channels for that mobile station, resulting in inefficient utilization of resources.

Also, if PDCCHs for transmitting the identification information of mobile stations communicating over downlink shared channels and transmission formats for the shared channels are erroneously decoded at a mobile station, the mobile station fails to receive the downlink shared channels and accordingly does not transmit acknowledgement information for those downlink shared channels. In this case, the base station apparatus has to determine whether the mobile station has actually transmitted the acknowledgement information. The acknowledgement information does not include an error check function such as CRC. Thus, if the determination is not made at the base station apparatus, the acknowledgement information would be determined to be either ACK or NACK, and particularly the determination that the acknowledgement information is ACK may be problematic.

Thus, the present invention addresses the above-mentioned problem, and one object of the present invention is to provide a base station apparatus and a communication control method that can perform scheduling and HARQ operations properly in uplinks and downlinks of LTE systems.

Means for Solving the Problem

In order to the above-mentioned problem, one aspect of the present invention relates to a base station apparatus for communicating to a mobile station over an uplink shared channel, including: a transmit instruction unit configured to assign an uplink shared channel to the mobile station and instruct the mobile station to conduct transmissions over the assigned uplink shared channel; a measurement unit configured to measure a radio quality of the assigned uplink shared channel; and a determination unit configured to determine based on the radio quality whether the mobile station has transmitted data over the assigned uplink shared channel.

A further one aspect of the present invention relates to a communication control method at a base station apparatus for communicating to a mobile station over an uplink shared channel, the method including: assigning an uplink shared channel to the mobile station and instructing the mobile station to conduct transmissions over the assigned uplink shared channel; measuring a radio quality of the uplink shared channel assigned to the mobile station; and determining based on the radio quality whether the mobile station has transmitted data over the assigned uplink shared channel.

A still further one aspect of the present invention relates to a communication control method at a base station apparatus for communicating to a mobile station over uplink and downlink shared channels, the method including: determining based on a radio quality of an uplink shared channel assigned to the mobile station whether the mobile station has transmitted data over the uplink shared channel; and if it is determined in the determining step that the mobile station has not transmitted data over the uplink shared channel, receiving downlink radio quality information or acknowledgement information to a downlink shared channel, which are mapped into an uplink control channel.

Advantage of the Invention

According to the embodiments of the present invention, it is possible to provide a base station apparatus and a communication control method that can perform scheduling and HARQ operations properly in uplinks and downlinks of LTE systems.

BRIEF DESCRIPTION OF DRAWINGS

FIG. 9 is a flowchart illustrating a transmission determination method according to one embodiment of the present invention;

FIG. 10 is a flowchart illustrating an acknowledgement determination method according to one embodiment of the present invention;

FIG. 11 is a flowchart illustrating a CQI reliability determination method according to one embodiment of the present invention;

FIG. 13 illustrates exemplary segmentation of resources in PUCCH; and

FIG. 14 is a flowchart illustrating a CQI reception method according to one embodiment of the present invention.

LIST OF REFERENCE SYMBOLS

Figure 1:
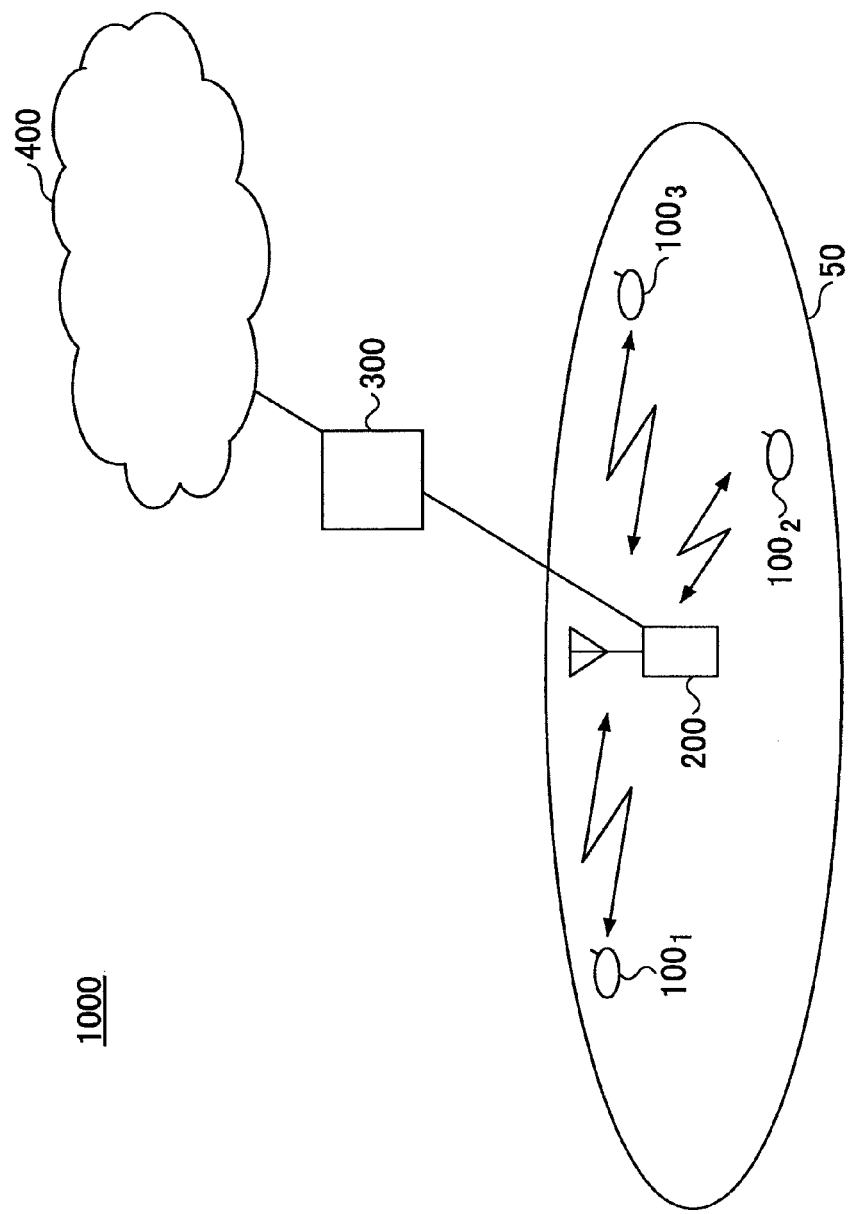
FIG. 1 is a block diagram illustrating a radio communication system according to one embodiment of the present invention.

200: base station apparatus
202: transmit and receive antenna
204: amplification unit
206: transmitting and receiving unit
208: baseband signal processing unit
210: call processing unit
212: channel interface
2081: layer 1 processing unit
2082: MAC processing unit
2083: RLC processing unit

BEST MODE FOR CARRYING OUT THE INVENTION

Best modes for carrying out the present invention are described below in conjunction with embodiments with reference to the accompanying drawings.

Throughout all the drawings for illustrating the embodiments, elements and components having the same function are referred to as the same reference numerals and are not repeatedly described.

[Description of Radio Communication System and Communication Channels]

A radio communication system where a base station apparatus according to one embodiment of the present invention is used is described with reference to FIG. 1.

A radio communication system 1000 may be an Evolved UTRA and UTRAN (also referred to as Long Term Evolution or Super 3G) applied system and includes a base station apparatus eNB (eNode B) 200 and multiple mobile station apparatuses or user equipment (UE) $100_n$ ($100_1$, $100_2$, $100_3$, ..., $100_n$ where n is a positive integer). The base station apparatus 200 is connected to an upper station such as an access gateway apparatus 300, which is connected to a core network 400. In this embodiment, the mobile station apparatuses $100_n$ communicate to the base station apparatus 200 within a cell 50 in accordance with the Evolved UTRA and UTRAN.

Hereinafter, unless specifically stated otherwise, it is assumed that the mobile stations $100_n$ have the same arrangement, function and state.

In the radio communication system 1000, the OFDM and the SC-FDMA are used as radio access schemes in downlinks and uplinks, respectively. As mentioned above, the OFDM is a scheme where a frequency band is segmented into smaller frequency bands (subcarriers) and data is transferred over the individual subcarriers. The SC-FDMA is a scheme where a frequency band is segmented and segmented different frequency bands are used among multiple terminals for transmission, resulting in reduction in interference among the terminals.

Communication channels in the Evolved UTRA and UTRAN are described below.

For downlinks, a PDSCH (Physical Downlink Shared Channel) shared among the mobile station apparatuses $100_n$ and a PDCCH (Physical Downlink Control Channel) for LTE are used. In the downlinks, the LTE PDCCH is used to transmit information on users which PDSCH is transmitted to and transport formats of the PDSCH, information on users which transmits PUSCH (Physical Uplink Shared Channel) and transport formats, acknowledgement information for the PUSCH or others. Also, user data is transmitted in PDSCH. The user data is transmitted in a DL-SCH (Downlink-Share Channel) as a transport channel.

The above-mentioned information on users which PDSCH is transmitted and transport formats of the PDSCH may be referred to as downlink scheduling information, downlink scheduling grant or downlink assignment information. Also, the above-mentioned information on users which transmits PUSCH and transport formats of the PUSCH may be referred to as uplink scheduling grant.

Figure 2:
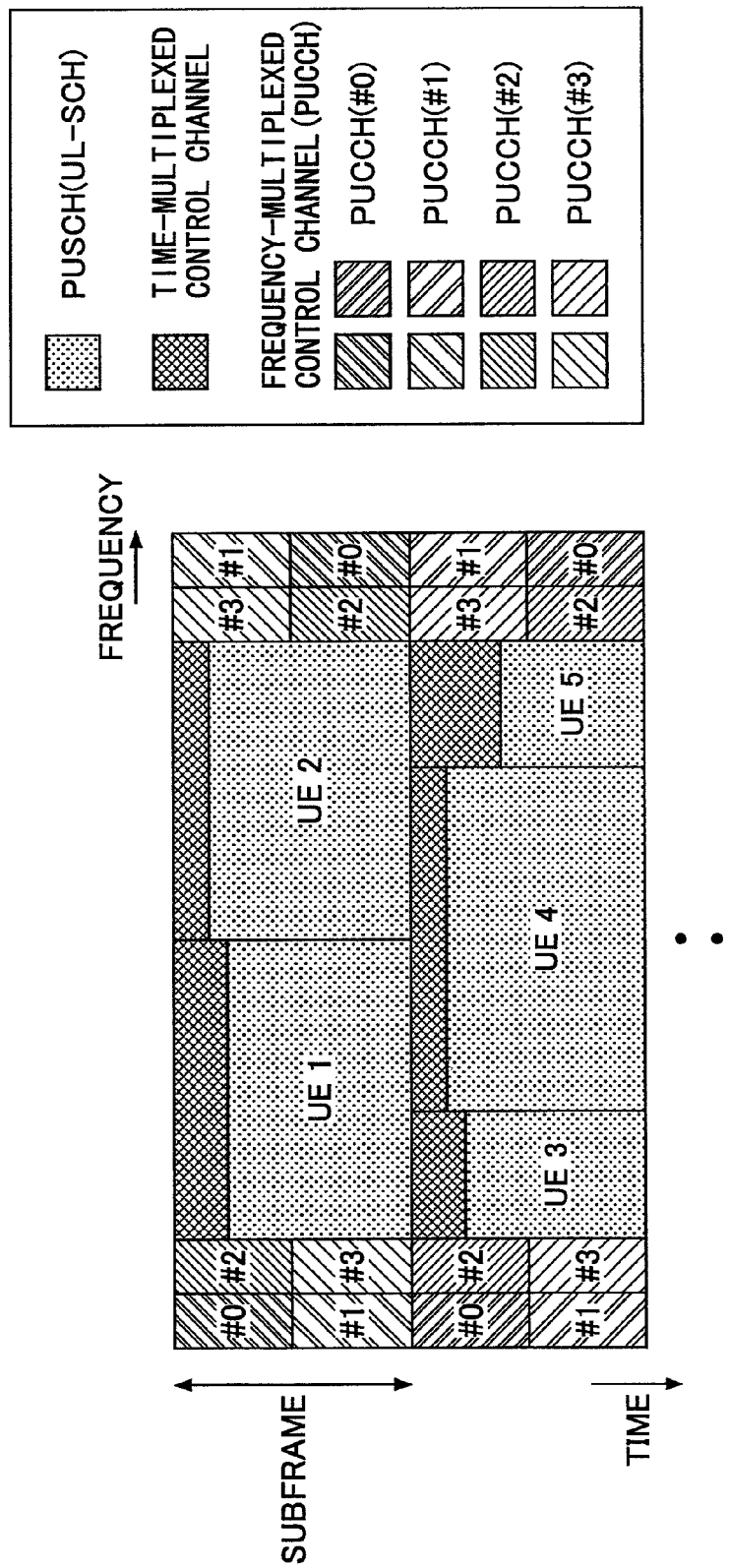
FIG. 2 is a schematic diagram illustrating a relationship between PUCCHs and PUSCHs according to one embodiment of the present invention.

For uplinks, the PUSCH (Physical Uplink Shared Channel) shared among the mobile station apparatuses $100_n$ and a LTE control channel are used. As illustrated in FIG. 2, the control channel includes two types of channels, a channel time-multiplexed with the PUSCH and a channel frequency-multiplexed with the PUSCH. The frequency-multiplexed channel is referred to as a PUCCH (Physical Uplink Control Channel). The time-multiplexed channel may be mapped into the top of a subframe as illustrated in FIG. 2 or into any other position within the subframe. For example, the time-multiplexed channel may be mapped into a SC-FDMA symbol near a SC-FDMA symbol into which a demodulation reference signal is mapped.

In the uplinks, the LTE PUCCH is used to transmit downlink quality information (CQI: Channel Quality Indicator) used for scheduling of the PDSCH and AMC (Adaptive Modulation and Coding) and acknowledgement information for the PDSCH (HARQ ACK information). Also, the PUSCH is used to transmit user data. The user data is transmitted in a UL-SCH (Uplink-Shared Channel) as a transport channel.

Figure 3:
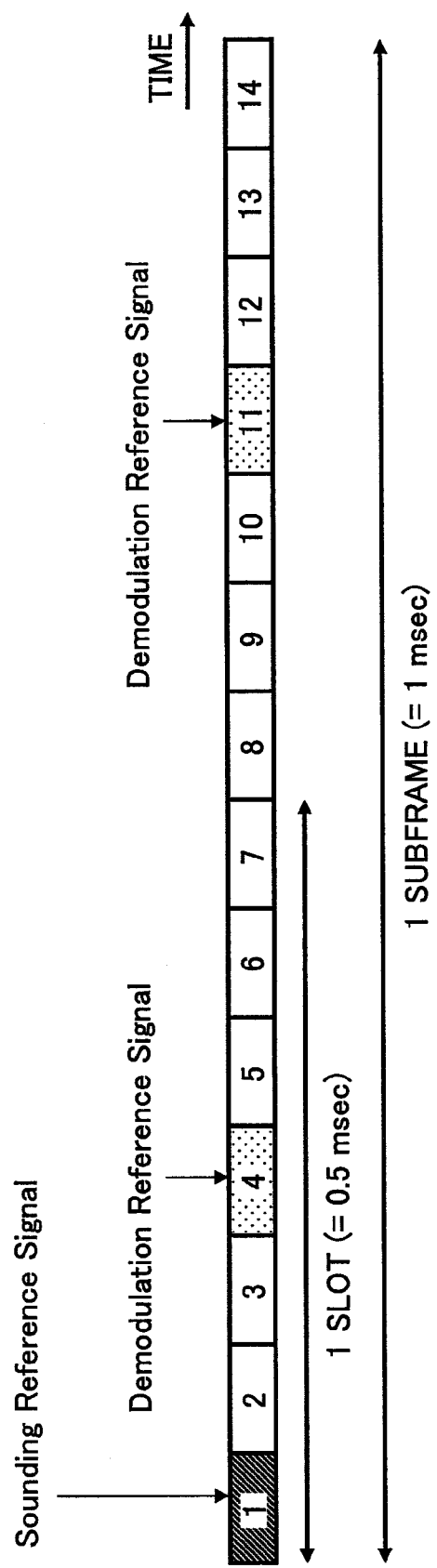
FIG. 3 is a schematic diagram illustrating an arrangement of a slot and a subframe according to one embodiment of the present invention.

For uplink transmissions, seven SC-FDMA symbols are used per slot. A single subframe consists of two slots. Thus, the single subframe consists of 14 SC-FDMA symbols as illustrated in FIG. 3. A demodulation reference signal (demodulation RS) for data demodulation is mapped into two of the 14 SC-FDMA symbols. Also, a sounding reference signal (sounding RS) used to determine a transmission format for the PUSCH, such as scheduling, uplink AMC and TPC, is transmitted in one of the 14 SC-FDMA symbols other than the two SC-FDMA symbols assigned for the demodulation RS. However, the sounding RS does not have to be mapped into all subframes. In the SC-FDMA symbols for transmitting the sounding RS, sounding RSs from multiple mobile stations are multiplexed in accordance with CDM (Code Division Multiplexing). For example, the demodulation RSs may be mapped into the fourth and eleventh SC-FDMA symbols within one subframe. Also, the sounding RS may be mapped into the first SC-FDMA symbol within one subframe, for example.

Note that in addition to the above-mentioned CDM, block spread multiplexing may be applied.

As illustrated in FIG. 3, a data modulation reference signal together with data is transmitted in uplink transmissions. Thus, it can be determined whether a data transmission is occurring by only checking the demodulation reference signal.

[Arrangement of Base Station Apparatus]

Figure 4:
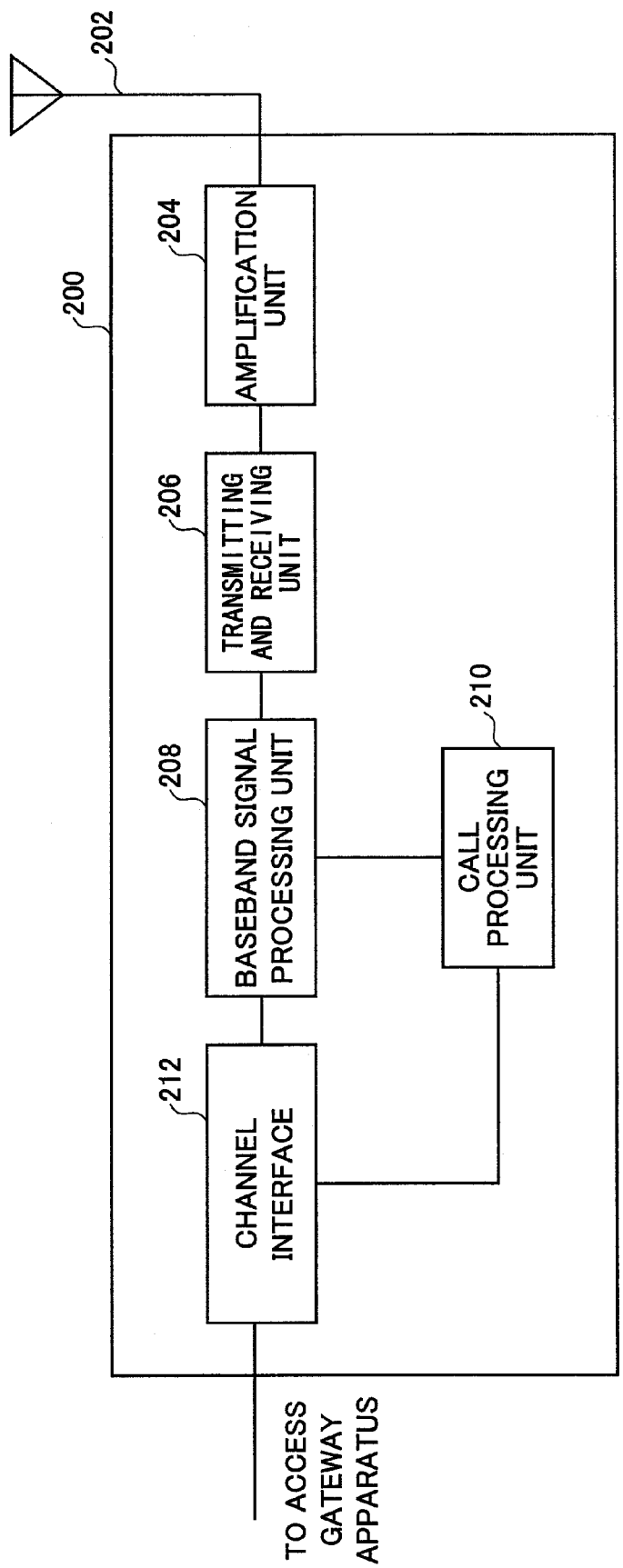
FIG. 4 is a partial block diagram illustrating a base station apparatus according to one embodiment of the present invention.

The base station apparatus 200 according to one embodiment of the present invention is described with reference to FIG. 4.

In this embodiment, the base station apparatus 200 includes a transmit and receive antenna 202, an amplification unit 204, a transmitting and receiving unit 206, a baseband signal processing unit 208, a call processing unit 210 and a channel interface 212.

User data transmitted from the base station apparatus 200 to the mobile station $100_n$ in downlinks is supplied to the baseband signal processing unit 208 from an upper station of the base station apparatus 200, such as the access gateway apparatus 300, via the channel interface 212.

The baseband signal processing unit 208 performs transmission operations in a PDCP layer, transmission operations in a RLC layer such as segmentation and concatenation of the user data and RLC (Radio Link Control) retransmission control, MAC (Medium Access Control) retransmission control such as HARQ (Hybrid Automatic Repeat reQuest) transmission operations, scheduling, transmission format selection, and/or channel decoding, IFFT (Inverse Fast Fourier Transform) and forwards the resulting data to the transmitting and receiving unit 206. Also, The baseband signal processing unit 208 performs transmission operations such as channel coding and IFFT on signals in the PDCCH serving as a downlink control channel and forwards the resulting signal to the transmitting and receiving unit 206.

The transmitting and receiving unit 206 performs frequency conversion for converting base band signals supplied from the baseband signal processing unit 208 into a radio frequency band, which is subsequently amplified at the amplification unit 204 and transmitted via the transmit and receive antenna 202.

On the other hand, for data transmitted from the mobile station $100_n$ to the base station apparatus 200 in uplinks, a radio frequency signal received at the transmit and receive antenna 202 is amplified at the amplification unit 204 and frequency-converted into a baseband signal at the transmitting and receiving unit 206. Then, the baseband signal is supplied to the baseband signal processing unit 208.

The baseband signal processing unit 208 performs a FFT operation, an IDFT operation, error correction decoding, a reception operation for MAC retransmission control, a reception operation at the RLC layer and/or a reception operation at the PDCP layer on user data in the supplied baseband signal and supplies the resulting signal to the access gateway apparatus 300 via the channel interface 212.

As will be described with reference to FIG. 5, the baseband signal processing unit 208 evaluates power of the uplink shared channel and determines whether the mobile station has actually transmitted the uplink shared channel. Uplink resource management is performed based on the determination.

Figure 5:
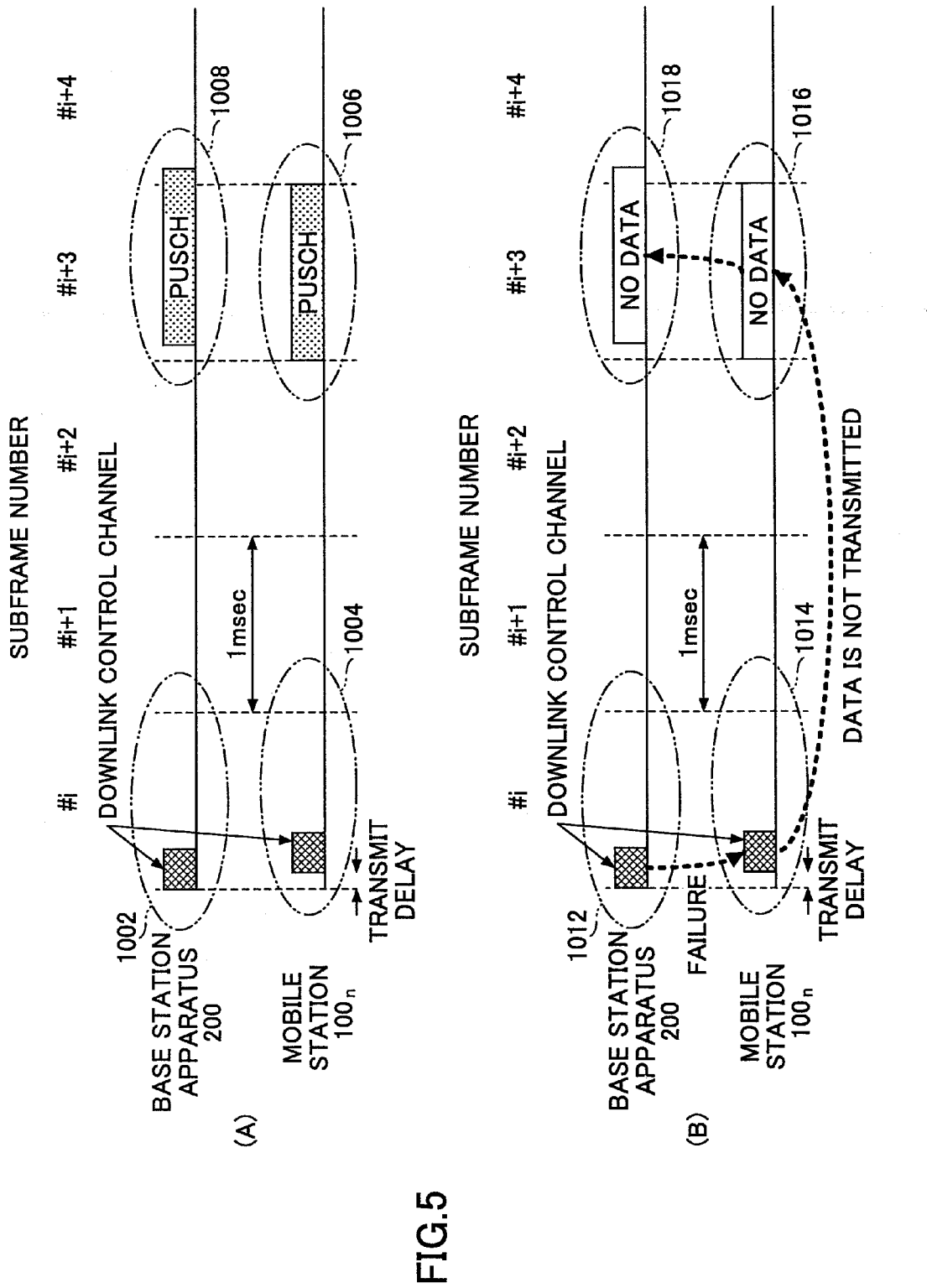
FIG. 5 is a first schematic diagram illustrating a temporal relationship between operations at a base station apparatus and a mobile station according to one embodiment of the present invention.

FIG. 5 illustrates the above-mentioned operations of the mobile station $100_n$ and the base station apparatus 220 from the temporal viewpoint. As illustrated in FIG. 5A, for example, at step 1002, the base station apparatus 200 informs the mobile station $100_n$ in subframe #i of an ID for a user communicating over the PUSCH in subframe #i+3 and/or transport format information for the user data, that is, the uplink scheduling grant. At step 1004, the mobile station $100_n$ receives a PDCCH in subframe #i. At step 1006, if the ID for the user communicating over the PUSCH in subframe #i+3 within the PDCCH matches the ID of the mobile station $100_n$, the mobile station $100_n$ transmits a PUSCH in subframe #i+3 based on the transport format information in the PDCCH, that is, the uplink scheduling grant. At step 1008, the base station apparatus 200 receives the PUSCH in the subframe #i+3 from the mobile station which the base station apparatus 200 informs that the mobile station should communicate over the PUSCH at timing 1002.

As illustrated in FIG. 5B, if the mobile station 100$_n$ fails to receive the PDCCH (1012) from the base station apparatus 200 successfully at step 1014, the mobile station 100$_n$ does not transmit the PUSCH in subframe #i+3 at step 1016. As a result, at step 1018, the base station apparatus 200 would fail to receive the PUSCH in subframe #i+3 from the mobile station 100$_n$. Thus, the base station apparatus 200 could make power determination for the uplink shared channel by checking the data demodulation reference signal at steps 1008 and 1018.

In the above-mentioned example, the power determination is made for the PUSCH corresponding to the uplink scheduling grant, which is the ID for the user communicating over the PUSCH and/or the transport format information for the user data. The uplink scheduling grant is transmitted to the mobile station 100$_n$ in subframe #i. In other embodiments, the same power determination can be applied to a PUSCH (UL-SCH) retransmitted in response to a NACK being transmitted as acknowledgement information to the PUSCH (UL-SCH). Exemplary operations of the mobile station 100$_n$ and the base station apparatus 200 in this case are described with reference to FIG. 6.

As illustrated FIG. 6A, for example, the base station apparatus 200 informs the mobile station 100$_n$ in a PDCCH in subframe #i of an ID for a user communicating over a PUSCH in subframe #i+3 and/or transport format information for the user data, that is, uplink scheduling grant at step 1202. At step 1204, the mobile station 100$_n$ receives the PDCCH in subframe #i. At step 1206, if the ID for the user communicating over the PUSCH in subframe #i+3 matches the ID of the mobile station 100$_n$, the mobile station 100$_n$ transmits a PUSCH in subframe #i+3 based on the transport format information within the PDCCH, that is, uplink scheduling grant. At step 1208, the base station apparatus 200 receives the PUSCH in subframe #i+3 from the mobile station which the base station apparatus 200 informs that the mobile station should communicate over the PUSCH in subframe #i+3, and determines that the decoding has been unsuccessful, that is, determines that the CRC check result is NG. In this case, at step 1210, the base station apparatus 200 transmits NACK as acknowledgement information to the PUSCH (UL-SCH as a transport channel) to the mobile station 100$_n$. Since the mobile station 100$_n$ receives the NACK at step 1212, the mobile station 100$_n$ transmits a PUSCH at a predefined timing, that is, in subframe #i+9 at step 1214. At step 1216, the base station apparatus 200 receives the PUSCH from the mobile station 100$_n$ to which it transmitted the NACK.

As illustrated in FIG. 6B, for example, the base station apparatus 200 informs the mobile station 100$_n$ in a PDCCH in subframe #i of an ID for a user communicating over a PUSCH in #i+3 subframe and/or transport format information for the user data, that is, uplink scheduling grant at step 1222. At step 1224, the mobile station 100$_n$ receives the PDCCH in subframe #i. At step 1226, if the ID for the user communicating over the PUSCH in subframe #i+3 matches the ID of the mobile station 100$_n$, the mobile station 100$_n$ transmits the PUSCH in subframe #i+3 based on the transport format information in the PDCCH, that is, the uplink scheduling grant. At Step 1228, the Base Station Apparatus 200 receives the PUSCH in subframe #i+3 from the mobile station 100$_n$ which the base station apparatus 200 informs that the mobile station 100$_n$ should communicate over the PUSCH and determines that the decoding has been unsuccessful, that is, determines that the CRC check result is NG. In this case, at step 1230, the base station apparatus 200 transmits a NACK as acknowledgement information (UL-SCH as a transport channel) to the mobile station 100$_n$. If the mobile station 100$_n$ erroneously determines the NACK as ACK at step 1232, the mobile station 100$_n$ does not transmit the PUSCH in subframe #i+9 at step 1234. As a result, the base station apparatus 200 would not also receive the PUSCH in subframe #i+9 from the mobile station 100$_n$ at step 1236. Thus, the base station apparatus 200 could conduct power determination (power detection) of the uplink shared channel by checking the data demodulation reference signal at steps 1216 and 1236.

In addition, as will be illustrated with reference to FIG. 7, the baseband signal processing unit 208 makes the power determination for a predefined portion of the received signal and determines whether the mobile station 100$_n$ has actually transmitted acknowledgement information. A transmission operation of MAC retransmission control is performed based on the determination. An exemplary case where the PUSCH is not transmitted from the mobile station 100$_n$ in a subframe and acknowledgement information is transmitted is described below. In this case, the acknowledgement information is transmitted in a PUCCH being a control channel frequency-multiplexed with the PUSCH.

Figure 7:
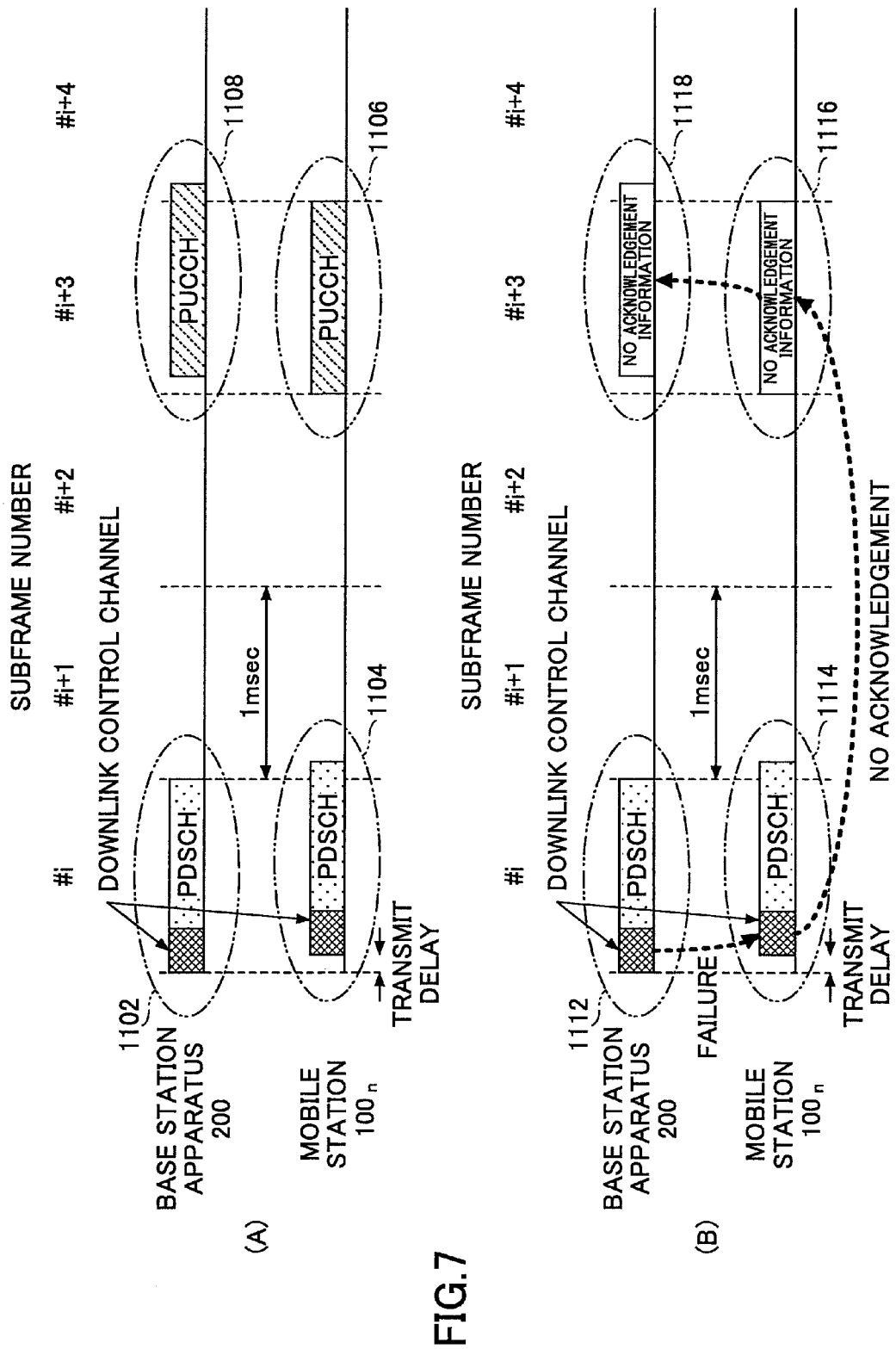
FIG. 7 is a third schematic diagram illustrating a temporal relationship between operations at the base station apparatus and the mobile station according to one embodiment of the present invention.

FIG. 7 illustrates the above-mentioned operations of the mobile station 100$_n$ and the base station apparatus 200 from a temporal viewpoint. As illustrated in FIG. 7A, for example, the base station apparatus 200 informs the mobile station 100$_n$ over a PDCCH in subframe #i of an ID for a user communicating over a PDSCH in subframe #i and/or transport format information for the user data, that is downlink scheduling information at step 1102. At step 1102, the base station apparatus 200 also transmits a PDSCH corresponding to the downlink scheduling information to the mobile station 100$_n$ in subframe #i. At step 1104, the mobile station 100$_n$ receives the PDCCH in subframe #i. At step 1104, if the ID for the user communicating over the PDSCH in subframe #i within the PDCCH matches the ID of the mobile station 100$_n$, the mobile station 100$_n$ receives the PDSCH based on the transport format information in the PDCCH, that is, downlink scheduling information. At step 1106, the mobile station 100$_n$ transmits acknowledgement information over an uplink control channel PUCCH in subframe #i+3 based on the CRC check result at reception of the PDSCH at step 1104. At step 1108, the base station apparatus 200 receives the acknowledgement information from the mobile station 100$_n$ which the base station apparatus 200 informs at step 1102 that the mobile station 100$_n$ should communicate over the PDSCH in subframe #i.

As illustrated in FIG. 7B, if the mobile station 100$_n$ fails to receive the PDCCH transmitted (1112) from the base station apparatus 200 at step 1114, the mobile station 100$_n$ does not receive the PDSCH and thus does not transmit acknowledgement information based on the CRC check result at reception of the PDSCH in subframe #i+3 at step 1116. Accordingly, the base station apparatus 200 also would not receive the PUCCH in subframe #i+3 from the mobile station 100$_n$ at step 1118. As a result, the base station apparatus 200 can make a SIR determination for the acknowledgement information by checking the data demodulation reference signal at steps 1108 and 1118. In other words, the base station apparatus can determine whether the mobile station 100$_n$ has actually transmitted the acknowledgement information. Furthermore, the base station apparatus 200 can determine whether the mobile station 100$_n$ has received downlink scheduling information.

The call processing unit 210 performs call operations such as communication channel setting or release, management of states of the radio base station 200 and/or radio resources.

An exemplary arrangement of the baseband signal processing unit 208 is described with reference to FIG. 8A.

Figure 8A:
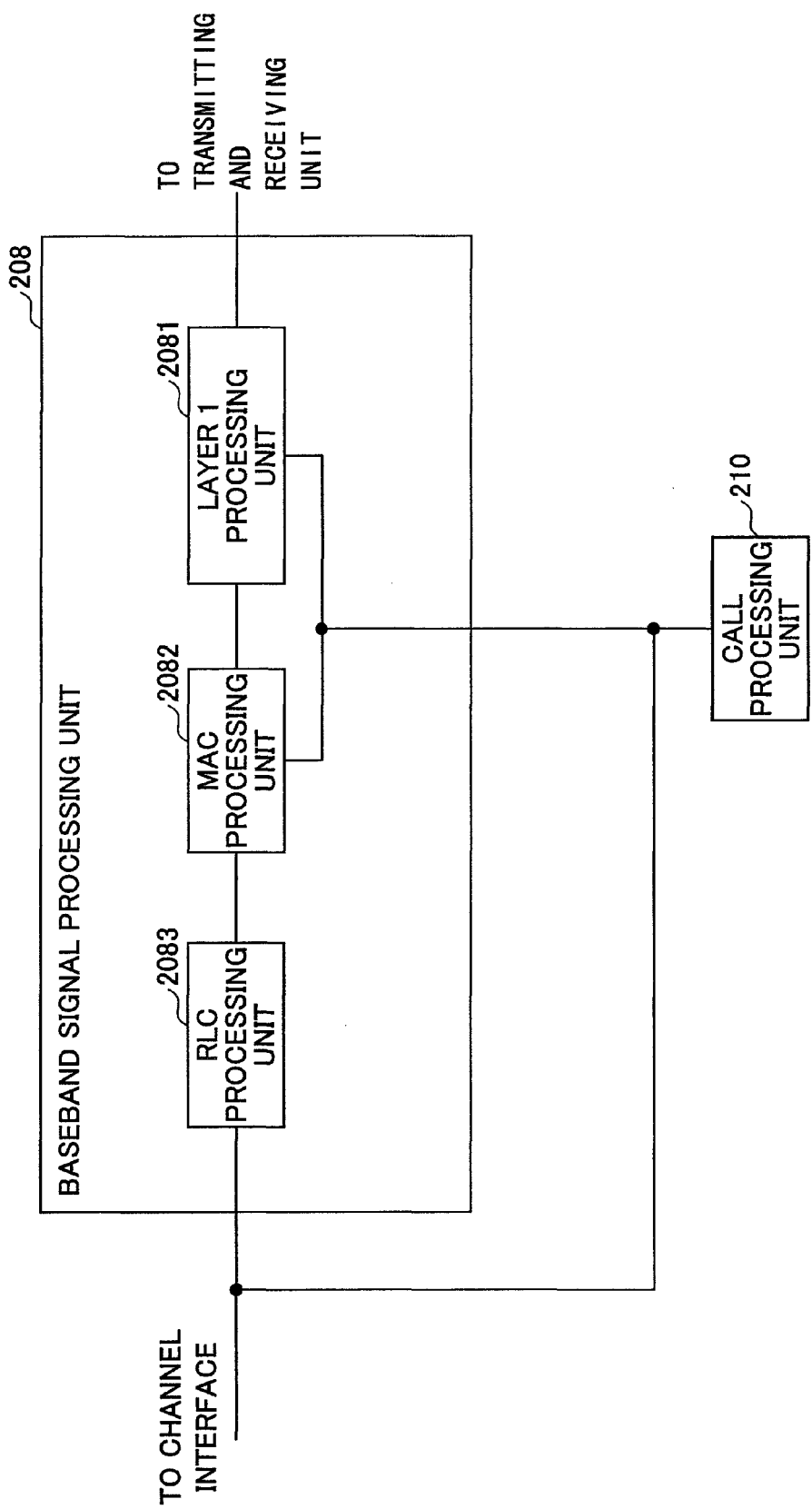
FIG. 8A is a partial block diagram illustrating a baseband signal processing unit in the base station apparatus according to one embodiment of the present invention.

As illustrated in FIG. 8A, the baseband signal processing unit 208 includes a layer 1 processing unit 2081, a MAC processing unit 2082 and a RLC processing unit 2083.

The layer 1 processing unit 2081, the MAC processing unit 2082 in the baseband signal processing unit 208, and the call processing unit 210 are coupled to each other.

The layer 1 processing unit 2081 performs channel coding and IFFT operations on shared channels transmitted in downlinks, reception operations, such as FFT and IDFT operations on shared channels transmitted in uplinks and channel decoding.

The layer 1 processing unit 2081 receives from the MAC processing unit 2082 an ID for a user communicating over a PDSCH and/or transport format information for the user data, that is, downlink scheduling information, and an ID for a user communicating over a PUSCH and/or transport format information for the user data, that is, uplink scheduling grant. Also, the layer 1 processing unit 2081 performs transmission operations such as channel coding and IFFT on the ID for the user communicating over the PDSCH and/or the transport format information for the user data, that is, the downlink scheduling information, and the ID for the user communicating over the PUSCH and/or the transport format information for the user data, that is, the uplink scheduling grant. The ID for the user communicating over the PDSCH and/or the transport format information for the user data, that is, the downlink scheduling information, and the ID for the user communicating over the PUSCH and/or the transport format information for the user data, that is, the uplink scheduling grant, are mapped into a PDCCH being a downlink control channel.

Also, the layer 1 processing unit 2081 demodulates and decodes acknowledgement information and CQI mapped into transmitted uplink control channels. If the layer 1 processing unit 2081 receives the acknowledgement information or the CQI for a mobile station that does not transmit user data in the subframe when the acknowledge information or the CQI is transmitted in uplinks, the layer 1 processing unit 2081 receives the acknowledgement information or the CQI mapped into PUCCHs placed at both ends of a system frequency band. Then, the layer 1 processing unit 2081 transmits the received acknowledgement information or CQI to the MAC processing unit 2082. The acknowledgement information consists of either of ACK, NACK or DTX, and the notation "DTX" means that the mobile station 100$_n$ has not actually transmitted the acknowledgement information. A DTX determination method, that is, a determination method of determining whether the mobile station 100$_n$ has actually transmitted the acknowledgement information is described below. The CQI is transmitted after performing reliability determination of the CQI as described below. In other words, only CQIs with higher reliability are transmitted to the MAC processing unit 2082 while CQIs with lower reliability are not transmitted to the MAC processing unit 2082.

Figure 6:
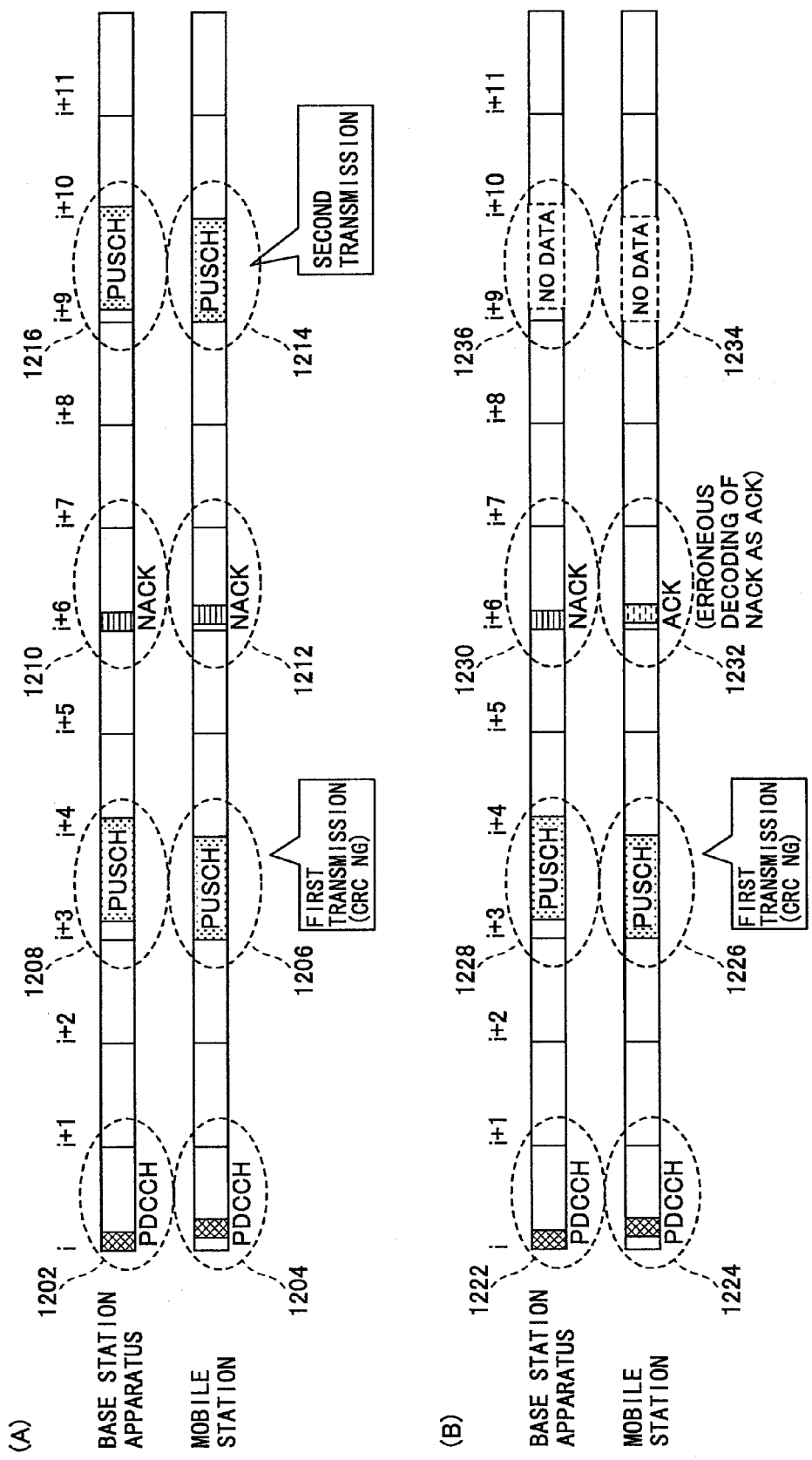
FIG. 6 is a second schematic diagram illustrating a temporal relationship between operations at the base station apparatus and the mobile station according to one embodiment of the present invention.

As described with reference to FIG. 5 or FIG. 6, if the mobile station 100$_n$ has not properly received the PDCCH into which the ID for the user communicating over the PUSCH or the transport format information for the user data is mapped or if the mobile station 100$_n$ has erroneously determined NACK transmitted as the acknowledgement information to the uplink shared channel as ACK, the mobile station 100$_n$ does not transmit the uplink shared channel. In this embodiment, the base station apparatus 200 determines whether the mobile station 100$_n$ has actually transmitted the uplink shared channel through reception operations such as FFT or IDFT operations on the transmitted uplink shared channel and channel decoding.

The layer 1 processing unit 2081 determines whether the mobile station 100$_n$ has actually transmitted the uplink shared channel in a subframe to be used by the mobile station 100$_n$ to transmit the uplink shared channel. For example, the layer 1 processing unit 2081 measures a SIR of a data demodulation reference signal in the PUSCH to be transmitted, and if the SIR is higher than a predefined threshold, the layer 1 processing unit 2081 may determine that the mobile station 100$_n$ has actually transmitted the uplink shared channel. On the other hand, if the SIR is lower than or equal to the predefined threshold, the layer 1 processing unit 2081 may determine that the mobile station 100$_n$ has not actually transmitted the uplink shared channel. In general, it may be determined based on comparison between quality of received signals and a threshold whether the PUSCH has been transmitted. Then, the layer 1 processing unit 2081 transmits results of power determination for the PUSCH to the MAC processing unit 2082.

The quality of received signals may be any value as long as it is a measure indicative of the quality of received signals such as the above-mentioned SIR and a reception level.

Also, if the layer 1 processing unit 2081 determines in the power determination for the PUSCH that the mobile station 100$_n$ has not actually transmitted the uplink shared channel, the layer 1 processing unit 2081 may transmit an ACK being positive acknowledgement to the mobile station 100$_n$ as the acknowledgement information to the uplink shared channel. Some effects of transmitting the ACK to the mobile station 100$_n$ are described below. If the UL-SCH power determination is erroneous, that is, if the mobile station 100$_n$ has actually transmitted the PUSCH (UL-SCH) but the base station apparatus 200 erroneously determines that the mobile station 100$_n$ has not transmitted it, the mobile station 100$_n$ continues retransmission. On the other hand, the base station apparatus 200 may sometimes assign resource blocks used by the mobile station 100$_n$ for the retransmissions to a new transmission by another mobile station (for example, mobile station 100$_m$ (m≠n)). In this case, the retransmission by the mobile station 100$_n$ may conflict with the new transmission by the mobile station 100$_m$, which may significantly degrade characteristics of both the retransmission by the mobile station 100$_n$ and the new transmission by the mobile station 100$_m$. As mentioned above, in the case where the positive acknowledgement ACK is transmitted as the acknowledgement information to the PUSCH (UL-SCH) for which it is determined that the mobile station 100$_n$ has not actually transmitted the uplink shared channel, mobile station 100$_n$ could be caused to stop the retransmission even if the mobile station 100$_n$ has actually transmitted the PUSCH (UL-SCH), which may prevent the above-mentioned collision.

In the above-mentioned embodiment, the layer 1 processing unit 2081 makes the power determination based on the SIR of the data demodulation reference signal in the PUSCH to be transmitted. In other embodiments, in addition to the SIR of the data demodulation reference signal in the PUSCH to be transmitted, the power determination may be made based on the SIR of a data signal in the PUSCH to be transmitted. It is possible to improve accuracy of the power determination by using the SIRs of both the reference signal and the data signal.

Alternatively, the power determination may be made based on only the SIR of the data signal in the PUSCH to be transmitted rather than the SIR of the data demodulation reference signal in the PUSCH to be transmitted.

The threshold may be set based on transmit power of the mobile station $100_n$. The transmit power of the mobile station $100_n$ may be transmitted to the mobile station $100_n$ as one information item in the uplink scheduling grant in the PDCCH, for example. Alternatively, the transmit power of the mobile station $100_n$ may be transmitted to the mobile station $100_n$ in association with payload size (data size) being one information item in the uplink scheduling grant. The association of the transmit power with the payload size means that correspondence between the transmit power and the payload size is predefined between the mobile station $100_n$ and the base station apparatus 200. More specifically, a greater threshold may be set if the transmit power is higher while a smaller threshold may be set if the transmit power is lower.

Alternatively, the threshold may be set based on power difference between the uplink shared channel and the sounding reference signal. More specifically, a greater threshold may be set if the power difference between the uplink shared channel and the sounding reference signal is larger while a smaller threshold may be set if the power difference between the uplink shared channel and the sounding reference signal is smaller.

Alternatively, the threshold may be set based on the modulation scheme for the uplink shared channel, for example. More specifically, a greater threshold may be set if the modulation scheme is 16QAM while a smaller threshold may be set if the modulation scheme is QPSK.

Alternatively, the threshold may be set based on MCS (Modulation and Scheme) level for the uplink shared channel. More specifically, a greater threshold may be set if the MCS level is higher while a smaller threshold may be set if the MCS level is lower. The MCS level may be defined based on at least one of a modulation scheme, a data size, transmit power, a required SIR and the amount of frequency resources.

Alternatively, the threshold may be set based on the amount of frequency resources for the PUSCH to be transmitted, that is, a transmit bandwidth or the number of resource blocks. More specifically, a greater threshold may be set if the amount of frequency resources is larger while a smaller threshold may be set if the amount of frequency resources is smaller. In this embodiment, information regarding the frequency resources for the PUSCH to be transmitted, that is, information regarding the resource blocks, may be transmitted to a mobile station in a form of frequency resource assignment information or resource block assignment information being one information item in uplink scheduling grant within a PDCCH, for example. For a larger amount of frequency resources, power determination can be made with higher accuracy. On the other hand, if the power determination is false, the involved impact would be significant, and thus the power determination must be performed more rigorously. In contrast, for a smaller amount of frequency resources, the power determination cannot be made with insufficient accuracy. On the other hand, if the power determination is false, the involved impact would be insignificant, and thus the power determination must be performed less rigorously than the case of the larger amount of frequency resources. In order to satisfy such requirements, it may be advantageous to set the threshold for the power determination based on the amount of frequency resources for the PUSCH, that is, the transmit bandwidth or the number of resource blocks.

An exemplary arrangement of the layer 1 processing unit 2081 is described in detail with reference to FIG. 8B. The layer 1 processing unit 2081 includes a CP removal unit 208102, a FFT unit 208104, a subcarrier demapping unit 208106, a demultiplexer (DEMUX) unit 208108, a channel estimation unit 208109, frequency equalization units 208110A-208110C, IDFT units 208112A-208112C, a PUSCH (UL-SCH) decoding unit 208114A, a PUCCH (ACK/NACK) decoding unit 208114B, a PUCCH (CQI) decoding unit 208114C, a signal power estimation unit 208116A, an interference power estimation unit 208118A, a SIR computation unit 208120A, a PUSCH power determination unit 208122A and a threshold setting unit 208124A.

The CP removal unit 208102 removes an attached CP portion from an uplink baseband signal incoming from the transmitting and receiving unit 206 at a predefined timing and supplies the resulting signal to the FFT unit 208104.

The FFT unit 208104 converts the whole system bandwidth from temporal domain signals into frequency domain signals through Fast Fourier Transform and supplies the converted signals to the subcarrier demapping unit 208106.

The subcarrier demapping unit 208106 restores demapped subcarriers into a multiplexed signal, and the demultiplexer 208108 segments the multiplexed signal into certain blocks. Signals for uplink shared channels are supplied to the frequency equalization unit 208110A. Acknowledgement information mapped into PUCCHs is supplied to the frequency equalization unit 208110B. CQIs mapped into PUCCHs are supplied to the frequency equalization unit 208110C. Demodulation reference signals in the PUCCHs or the uplink shared channels are supplied to the channel estimation unit 208109.

The frequency equalization unit 208110A performs reception operations in accordance with channel compensation (restore phases turned in transmission into original transmit states) using channel estimation values from the channel estimation unit 208109. The resulting signals for uplink shared channels are decoded at the IDFT unit 208112A and the PUSCH (UL-SCH) decoding unit 208114A.

Signals subjected to IDFT processing at the IDFT unit 208112A are supplied to the signal power estimation unit 208116A and the interference power estimation unit 208118A.

The frequency equalization unit 208110B performs reception operations in accordance with channel compensation (restore phases turned in transmission into original transmit states) using channel estimation values from the channel estimation unit 208109. The resulting signals for acknowledgement information mapped into control channels are decoded at the IDFT unit 208112B and the PUCCH (ACK/NACK) decoding unit 208114B.

The frequency equalization unit 208110C performs reception operations in accordance with channel compensation (restore phases turned in transmission into original transmit states) using channel estimation values from the channel estimation unit 208109. The resulting signals for the CQIs mapped into control channels are decoded at the IDTF unit 208112C and the PUCCH (ACK/NACK) decoding unit 208114C.

The channel estimation unit 208109 derives the channel estimation values from uplink demodulation reference signals generated at the demultiplexer 208108. The channel estimation values are supplied to the frequency equalization units 208110A-208110C.

The signal power estimation unit 208116A derives a signal power level of the IDFT processed uplink shared channel supplied from the IDFT unit 208112A and supplies the derived signal power level to the SIR computation unit 208120A.

The interference power estimation unit 208116A derives an interference power level of a frequency band for transmitting the IDFT processed uplink shared channel supplied from the IDFT unit 208112A and supplies the derived interference power level to the SIR computation unit 208120A.

The SIR computation unit 208120A derives a SIR based on the signal power level received from the signal power estimation unit 208116A and the interference power level received from the interference power estimation unit 208118A and supplies the derived SIR to the PUSCH power determination unit 208122A.

The PUSCH power determination unit 208122A determines whether a mobile station has actually transmitted the uplink shared channel PUSCH based on comparison between the SIR supplied from the SIR computation unit 208120A and a threshold supplied from the threshold setting unit 208124A. In other words, the PUSCH power determination unit 208122A makes the determination as to whether the mobile station 100$_n$ has actually transmitted the uplink shared channel as described above in conjunction with the layer 1 processing unit 2081 and performs operations for (1) UL-SCH power determination method as described below. The PUSCH power determination unit 208122A transmits to the MAC processing unit 2082 the determination result as to whether the mobile station has actually transmitted the uplink shared channel PUSCH.

Also, if the PUSCH power determination unit 208122A determines that the mobile station 100$_n$ has not actually transmitted the uplink shared channel, the PUSCH power determination unit 208122A may determine that positive response ACK should be transmitted to the mobile station 100$_n$ as acknowledgement information to the uplink shared channel. In this case, for example, the determination result that the positive response ACK should be transmitted to the mobile station 100$_n$ is transmitted to the MAC processing unit 2082, which may perform transmission operations on the positive response ACK as a part of HARQ operations. Alternatively, the determination result that the positive response ACK should be transmitted to the mobile station 100$_n$ is transmitted from the PUSCH power determination unit 208122A to a transmission operation executing part in the layer 1 processing unit 2081, which may perform transmission operations on the positive response ACK.

The threshold setting unit 208124A sets a threshold used for the determination at the PUSCH power determination unit 208122A and transmits the threshold to the PUSCH power determination unit 208122A.

In this embodiment, the threshold setting unit 208124A may set the threshold based on transmit power for use in the mobile station, as mentioned above. Alternatively, the threshold setting unit 208124A may set the threshold based on a modulation scheme for the uplink shared channel, as mentioned above. Alternatively, the threshold setting unit 208124A may set the threshold based on the MCS level for the uplink shared channel, as mentioned above. Alternatively, the threshold setting unit 208124A may set the threshold based on the amount of frequency resources for the uplink shared channel, as mentioned above. Alternatively, the threshold setting unit 208124A may set the threshold based on power difference between the uplink shared channel and a sounding reference signal, as mentioned above.

In this manner, the layer 1 processing unit 2081 in the base station apparatus 200 determines whether a mobile station has actually transmitted the PUSCH through the power determination for the PUSCH. The determination as to whether a mobile station has actually transmitted the PUSCH makes it possible to determine whether the mobile station has successfully received uplink scheduling grant within a PDCCH or acknowledgement information to the PUSCH within the PDCCH, as illustrated in FIGS. 5 and 6.

Also as illustrated with reference to FIG. 7, if a mobile station failed to receive an ID for a user communicating over a downlink shared channel and/or transport format information for the user data, that is, a PDCCH into which the downlink scheduling information is mapped, the mobile station does not receive the PDSCH and thus does not transmit the acknowledgement information at a predefined timing. In this embodiment, the layer 1 processing unit 2081 determines whether a mobile station has actually transmitted the acknowledgement information. Also in this embodiment, it is assumed that the PUSCH is not transmitted from a mobile station at a subframe and the acknowledgement information is transmitted instead. In other words, the case where the acknowledgement information is transmitted over a control channel PUCCH frequency-multiplexed with the PUSCH is described below.

The layer 1 processing unit 2081 determines whether the mobile station 100$_n$ has actually transmitted the acknowledgement information in a subframe to transmit the acknowledgement information in a PUCCH. For example, the layer 1 processing unit 2081 measures a SIR for a data demodulation reference signal in the PUCCH into which the acknowledgement information may be mapped. If the SIR is higher than a predefined threshold, the layer 1 processing unit 2081 may determine that the mobile station 100$_n$ has actually transmitted the acknowledgement information. On the other hand, if the SIR is lower than the predefined threshold, the layer 1 processing unit 2081 may determine that the mobile station 100$_n$ has not actually transmitted the acknowledgement information. In general, the determination may be made through comparison between quality of a received signal and the threshold. For the quality of a received signal, any measure such as the above-mentioned SIR or receive level may be used as long as it indicates the quality of the received signal. Then, the layer 1 processing unit 2081 transmits a result of power determination on the acknowledgement information to the MAC processing unit 2082. Note that the determination as to whether the mobile station 100$_n$ has actually transmitted the acknowledgement information is applicable even in any of the cases where only the acknowledgement information is transmitted, the acknowledgement information and CQI are multiplexed with each other and transmitted, and other control information items such as a scheduling request and a release request are multiplexed with each other and transmitted. In these cases, different thresholds may be set. Also, even if a joint coding scheme to encode the acknowledgement information and the CQI together is applied to multiplex the acknowledgement information with the CQI or even if a separate coding scheme to encode the acknowledgement information and the CQI separately is applied to multiplex the acknowledgement information with the CQI, the above-mentioned determination as to whether the mobile station 100$_n$ has actually transmitted the acknowledgement information is still applicable.

In the case where only the acknowledgement information is transmitted, for example, the acknowledgement information may be transmitted in any of resources A illustrated in FIG. 13. Also in the case where the acknowledgment information and the CQI are multiplexed with each other and transmitted, for example, they may be transmitted in any of resources B illustrated in FIG. 13. Multiple resources are multiplexed in FIG. 13, but any of multiplexing schemes such as CDM, block spreading multiplexing, frequency multiplexing, time multiplexing or any combination thereof may be applied. In addition, the CDM may include Walsh CDM and CAZAC sequence CDM, for example.

For example, a threshold used for the power determination in the case of transmission of the multiplexed acknowledgement and the CQI may be set to be greater than that in the case of transmission of only the acknowledgement information. More specifically, in the case of transmission of the multiplexed acknowledgement information and CQI, if a mobile station has failed to successfully receive a PDCCH transmitted (1112) by the base station apparatus 200 (1114), the mobile station would transmit only the CQI. In this case, the layer 1 processing unit 2081 has to determine a difference between the power in the transmission of only the CQI and the power in the transmission of the multiplexed acknowledgement information and CQI. To this end, a greater threshold would be set than that for the power determination in the transmission of only the acknowledgement information.

In this embodiment, the layer 1 processing unit 2081 makes the power determination based on the SIR for the data demodulation reference signal in the PUCCH to be transmitted. In other embodiments, in addition to the SIR for the data demodulation reference signal in the PUCCH to be transmitted, the layer 1 processing unit 2081 may make the power determination based on the acknowledgement information to be transmitted or the SIR of a signal sequence of the multiplexed acknowledgement information and the CQI if the CQI is multiplexed. By using both the SIR of the reference signal and the SIR of the signal sequence of the acknowledgement information and the CQI, the accuracy of the power determination can be improved.

Alternatively, the power determination may be made based on the acknowledgement information to be transmitted or only the SIR for the signal sequence of the multiplexed acknowledgement information and CQI if the CQI is multiplexed rather than the SIR for the data demodulation reference signal in the PUCCH to be transmitted.

An exemplary arrangement of the layer 1 processing unit 2081 is described in detail with reference to FIG. 8C. The layer 1 processing unit 2081 includes a CP removal unit 208102, a FFT unit 208104, a subcarrier demapping unit 208106, a demultiplexer (DEMUX) unit 208108, a channel estimation unit 208109, frequency equalization units 208110A-208110C, IDFT units 208112A-208112C, a PUSCH (UL-SCH) decoding unit 208114A, a PUCCH (ACK/NACK) decoding unit 208114B, a PUCCH (CQI) decoding unit 208114C, a signal power estimation unit 208116B, an interference power estimation unit 208118B, a SIR computation unit 208120B, a PUCCH power determination unit 208126B and a threshold setting unit 208124B.

Figure 8B:
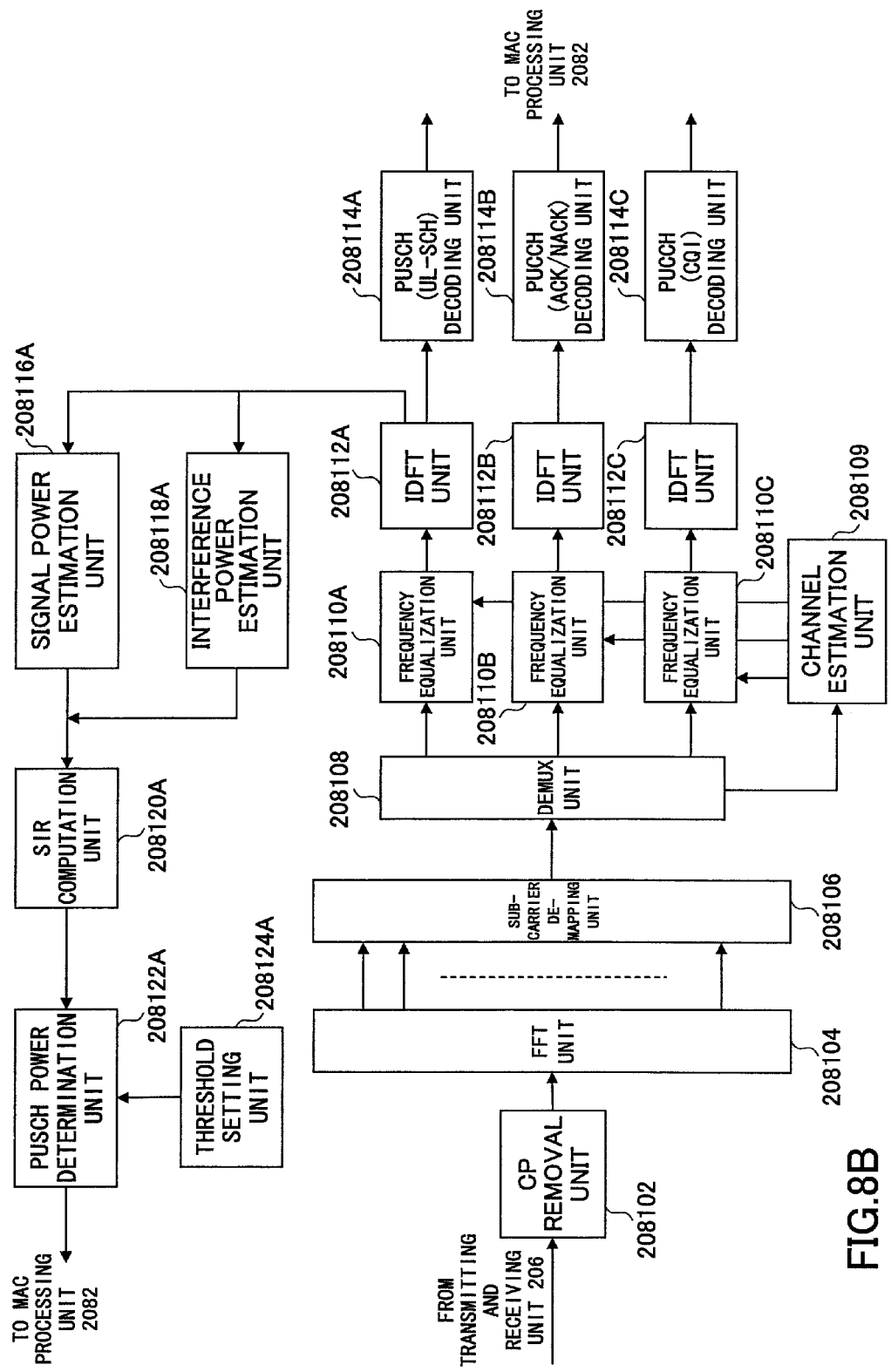
FIG. 8B is a partial block diagram illustrating the layer 1 processing unit in the base station apparatus according to one embodiment of the present invention.
Figure 8C:
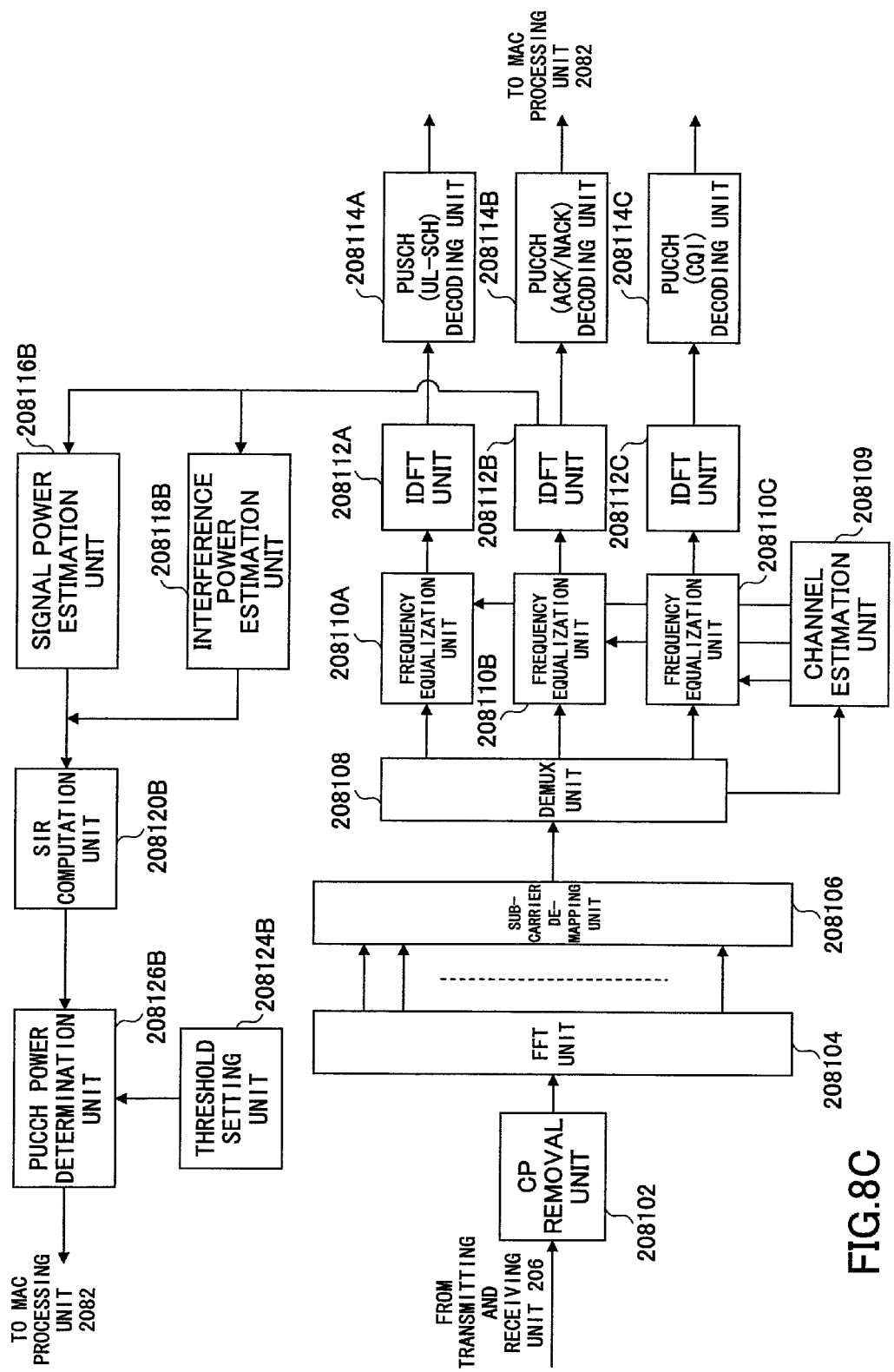
FIG. 8C is a partial block diagram illustrating the layer 1 processing unit in the base station apparatus according to one embodiment of the present invention.

The components other than the IDFT unit 208112B, the signal power estimation unit 208116B, the interference power estimation unit 208118B, the SIR computation unit 208120B, the PUCCH power determination unit 208126B and the threshold setting unit 208124B are the same as those in FIG. 8B and thus are not repeatedly described.

The IDFT unit 208112B performs IDFT on signals subjected to reception operations through channel compensation at the frequency equalization unit 208110B and supplies the resulting signals to the PUCCH (ACK/NACK) decoding unit 208114B. Also, the IDFT unit 208112B supplies the IDFT processed signals to the signal power estimation unit 208116B and the interference power estimation unit 208118B.

The signal power estimation unit 208116B derives a signal power level of the IDFT processed uplink control channel received from the IDFT unit 208112B and supplies the derived signal power level to the SIR computation unit 208120B.

The interference power estimation unit 208116B derives an interference power level after the IDFT processing of a frequency band for transmitting the uplink control channel received from the IDFT unit 208112B and supplies the derived interference power level to the SIR computation unit 208120B.

The SIR computation unit 208120B derives a SIR based on the signal power level supplied from the signal power estimation unit 208116B and the interference power level supplied from the interference power estimation unit 208118B and supplies the derived SIR to the PUCCH power determination unit 208126B.

The PUCCH power determination unit 208126B determines whether a mobile station has actually transmitted acknowledgement information over a PUCCH based on comparison between the SIR supplied from the SIR computation unit 208120B and a threshold supplied from the threshold setting unit 208124B. In other words, the PUCCH power determination unit 208126B determines whether the mobile station $100_n$ has actually transmitted the acknowledgement information as described in conjunction with the layer 1 processing unit 2081 and (2) performs reception operations of HARQ ACK. The PUCCH power determination unit 208126B transmits the determination result to the MAC processing unit 2082.

The threshold setting unit 208124B sets a threshold used for the determination at the PUCCH power determination unit 208126B and transmits the threshold to the PUCCH power determination unit 208126B.

The operations as described with reference to FIG. 8C may be applied to the case of transmission of only the acknowledgement information over the PUCCH or to the case of transmission of the multiplexed acknowledgement information downlink radio quality information CQI.

In this manner, the layer 1 processing unit 2081 in the base station apparatus 200 determines whether a mobile station has actually transmitted the acknowledgement information through the power determination for the acknowledgement information to the downlink shared channel in the PUCCH. The determination as to whether the mobile station has actually transmitted the acknowledgement information makes it possible to determine whether the mobile station has successfully received downlink scheduling information within the PDCCH, as illustrated in FIG. 7.

Also, the layer 1 processing unit 2081 performs reception operations on the CQI mapped into the PUCCH placed at both ends of the system band if the CQI is received for a mobile station that does not receive user data in uplinks in a subframe. At this time, the layer 1 processing unit 2081 may determine reliability of the CQI. In other words, the layer 1 processing unit 2081 measures a SIR of a sequence of received bits for the CQI in a PUCCH into which the CQI is mapped. If the SIR is higher than a predefined threshold, the layer 1 processing unit 2081 determines that the received CQI reliability is high, and on the other hand, if the SIR is lower than or equal to the predefined threshold, the layer 1 processing unit 2081 determines that the received CQI reliability is low. In general, the received CQI reliability may be determined depending on comparison between quality of received signals and a threshold. The quality of received signals may be any measure such as the SIR and a receive level as long as the measure indicates quality of the received signals. In this embodiment, the SIR of the sequence of received bits for the CQI may be for a bit sequence with the maximum correlation value, that is, a bit sequence with the maximum likelihood within the CQI bit sequence. Alternatively, the layer 1 processing unit 2081 may measure the SIR for a data demodulation reference signal in the PUCCH into which the CQI is mapped. Alternatively, the layer 1 processing unit 2081 may measure both the SIR for the data demodulation reference signal in the PUCCH into which the CQI is mapped and the SIR for the sequence of received bits for the CQI in the PUCCH into which the CQI is mapped. In this embodiment, as a result of the determination of the CQI reliability, the layer 1 processing unit 2081 may transmit only the CQI with high reliability to the MAC processing unit 2082 and does not transmit the CQI with insufficient reliability to the MAC processing unit 2082. In this case, the CQI with insufficient reliability would not be used in scheduling and AMC.

When the reliability is determined, the layer 1 processing unit 2081 may determine whether a mobile station has actually transmitted the CQI. If the layer 1 processing unit 2081 determines that the mobile station has not actually transmitted the CQI, the layer 1 processing unit 2081 may determine that an uplink of the mobile station is out of synchronization.

Figure 8D:
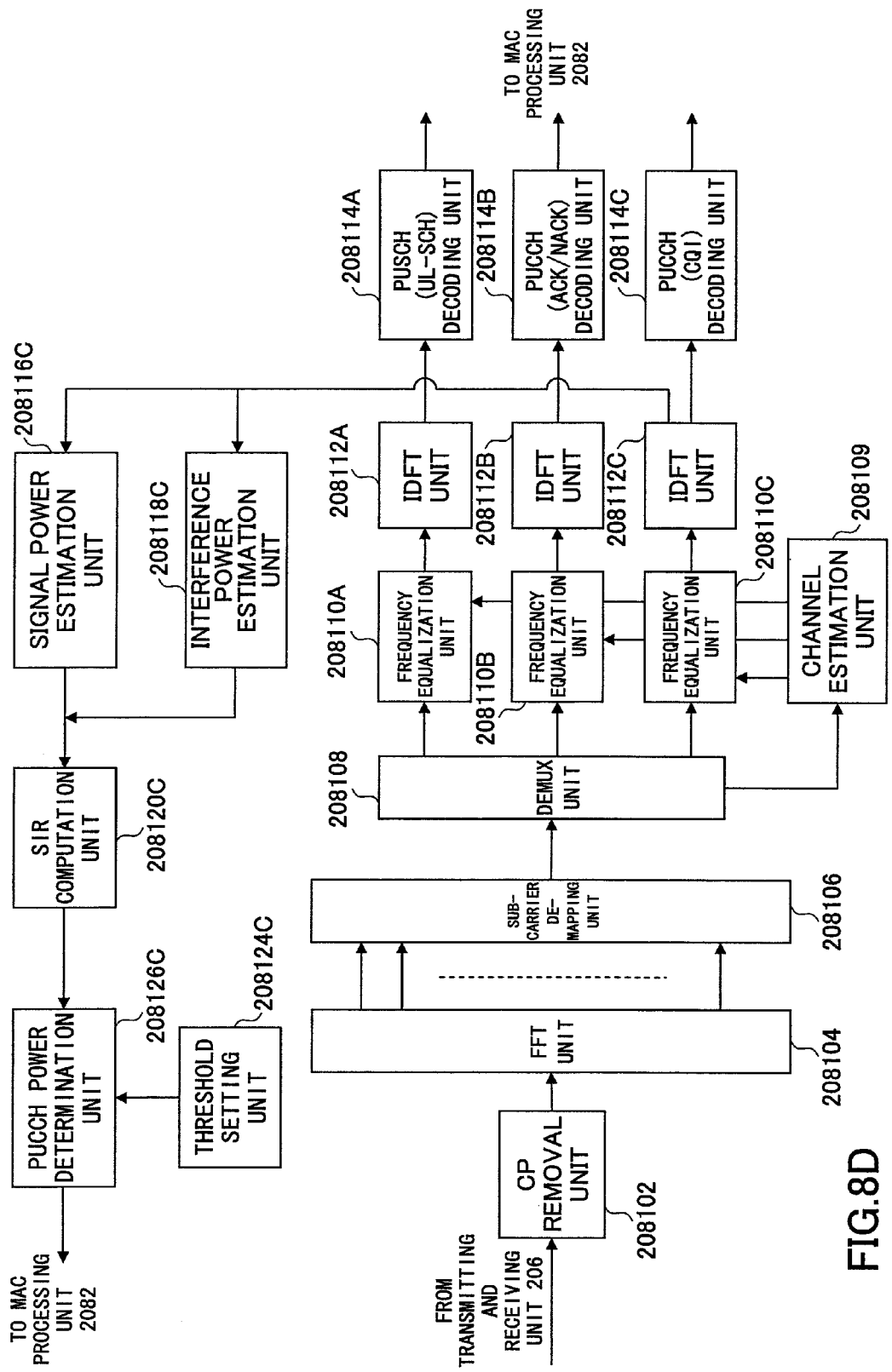
FIG. 8D is a partial block diagram illustrating the layer 1 processing unit in the base station apparatus according to one embodiment of the present invention.

An exemplary arrangement of the layer 1 processing unit 2081 is described in detail with reference to FIG. 8D. The layer 1 processing unit 2081 includes a CP removal unit 208102, a FFT unit 208104, a subcarrier demapping unit 208106, a demultiplexer (DEMUX) unit 208108, a channel estimation unit 208109, frequency equalization units 208110A-208110C, IDFT units 208112A-208112C, a PUSCH (UL-SCH) decoding unit 208114A, a PUCCH (ACK/NACK) decoding unit 208114B, a PUCCH (CQI) decoding unit 208114C, a signal power estimation unit 208116C, an interference power estimation unit 208118C, a SIR computation unit 208120C, a PUCCH power determination unit 208126C and a threshold setting unit 208124C.

The components other than the IDFT unit 208112C, the signal power estimation unit 208116C, the interference power estimation unit 208118C, the SIR computation unit 208120C, the PUCCH power determination unit 208126C and the threshold setting unit 208124C are the same as those in FIG. 8B and thus are not repeatedly described.

The IDFT unit 208112C performs IDFT on signals subjected to reception operations through channel compensation at the frequency equalization unit 208110C and supplies the resulting signals to the PUCCH (ACK/NACK) decoding unit 208114C. Also, the IDFT unit 208112C supplies the IDFT processed signals to the signal power estimation unit 208116C and the interference power estimation unit 208118C.

The signal power estimation unit 208116C derives a signal power level of the IDFT processed uplink control channel received from the IDFT unit 208112C and supplies the derived signal power level to the SIR computation unit 208120C.

The interference power estimation unit 208118B derives an interference power level for the IDFT processed signals of a frequency band for transmitting the uplink control channel received from the IDFT unit 208112C and supplies the derived interference power level to the SIR computation unit 208120C.

The SIR computation unit 208120C derives a SIR based on the signal power level supplied from the signal power estimation unit 208116C and the interference power level supplied from the interference power estimation unit 208118C and supplies the derived SIR to the PUCCH power determination unit 208126C.

The PUCCH power determination unit 208126C determines reliability of radio quality information CQI for downlinks transmitted from a mobile station based on comparison between the SIR supplied from the SIR computation unit 208120C and a threshold supplied from the threshold setting unit 208124C. In other words, the PUCCH power determination unit 208126C determines the CQI reliability as described in conjunction with the layer 1 processing unit 2081 and (3) performs CQI reliability determination as describe below. The PUCCH power determination unit 208126C transmits the determination result of the CQI reliability to the MAC processing unit 2082 pending.

The threshold setting unit 208124C sets a threshold used for the determination at the PUCCH power determination unit 208126C and transmits the threshold to the PUCCH power determination unit 208126C.

The MAC processing unit 2082 receives reception results of the acknowledgement information and the CQI mapped into uplink control channels.

The MAC processing unit 2082 performs MAC retransmission control on downlink user data such as HARQ transmission operations, scheduling operations, selection operations of transmission formats and frequency resource assignment operations. The scheduling operation may mean selection of a mobile station that receives user data over a downlink shared channel in a subframe. The selection operation of transmission formats may mean determination of a modulation scheme, a coding rate and a data size for user data received at the mobile station selected in the scheduling operation. The determination of a modulation scheme, a coding rate and a data size may be made based on a CQI transmitted from the mobile station in uplinks, for example. In addition, the frequency resource assignment operation may mean to determine a resource block to be used for user data received at the mobile station selected in the scheduling operation. The resource block determination may be made based on the CQI transmitted from the mobile station in uplinks, for example. The MAC processing unit 2082 transmits to the layer 1 processing unit 2081 an ID for a user communicating over a PDSCH and/or transport format information for user data, that is, downlink scheduling information, which are determined in the scheduling operation, the transmission format selection operation and the frequency resource assignment operation.

The MAC processing unit 2082 performs reception operations for the MAC retransmission control over uplink user data, scheduling operations, transmission format selection operations, frequency resource assignment operations and/or others. The scheduling operation may mean selection of a mobile station to transmit user data over a shared channel in a certain subframe. The transmission format selection operation means to determine a modulation scheme, a coding rate and a data size for user data transmitted from the mobile station selected in the scheduling operation. The determination of a modulation scheme, a coding rate and a data size may be made based on a SIR, receive power and/or path loss for a sounding reference signal transmitted from the mobile station in uplinks, for example. The frequency resource assignment operation means to determine a resource block used to transmit user data from the mobile station selected in the scheduling operation. The resource block determination may be made based on the SIR for the sounding reference signal transmitted from the mobile station in uplinks, for example. Then, the MAC processing unit 2082 transmits to the layer 1 processing unit 2081 an ID for a user communicating over a PUSCH and/or transport format information for the user data, that is, uplink scheduling grant, as determined in the scheduling operation, the transport format selection operation and the frequency resource assignment operation.

The MAC processing unit 2082 receives results of the power determination for uplink shared channels from the layer 1 processing unit 2081. If it is determined in the power determination that the mobile station 100$_n$ has not actually transmitted the uplink shared channel, the MAC processing unit 2082 determines that the mobile station 100$_n$ failed to receive the previously transmitted corresponding PDCCH or that the mobile station 100$_n$ failed to receive the previously transmitted corresponding acknowledgement information to the uplink shared channel, the MAC processing unit 2082 releases a retransmission resource assigned to the uplink shared channel. In this embodiment, the releasing of a resource means that the resource is reassigned to an uplink shared channel for another mobile station or to another uplink shared channel newly transmitted from the current mobile station. According to Evolved UTRA and UTRAN, synchronous HARQ is used in uplinks. Thus, the uplink shared channel is transmitted from the mobile station to the base station apparatus 200 at a predefined timing until it is successfully received or until the number of retransmissions reaches a maximum number of transmissions. On the other hand, if it is determined that the mobile station 100$_n$ has not actually transmitted the uplink shared channel, all retransmission resources in subframes to be retransmitted in future are released for the uplink shared channel.

The MAC processing unit 2082 receives results of power determination for acknowledgement information mapped into PUCCHs that are frequency-multiplexed with PUSCHs and transmitted from the layer 1 processing unit 2081. Then, if it is determined as a result of the power determination that the mobile station 100$_n$ has not actually transmitted the acknowledgement information, the MAC processing unit 2082 determines that the previously transmitted corresponding downlink shared channel has not been successfully received and retransmits information mapped into the previously transmitted corresponding downlink shared channel. For example, the MAC processing unit 2082 determines that the mobile station 100$_n$ failed to receive not the shared channel but downlink scheduling information in a PDCCH attached thereto and then assumes the information mapped into the downlink shared channel as the previous transmission would be invalid. In other words, if the previous transmission corresponds to the first transmission, the current transmission may be also performed as the first transmission. Also, if the previous transmission corresponds to the second transmission, the current transmission may be also performed as the second transmission.

Also in the case where the power determination is negative (NACK) for the acknowledgement information transmitted in a PUCCH where the acknowledgement information is multiplexed with the CQI, the MAC processing unit 2082 may determine that the corresponding downlink transmission is invalid and transmit information mapped into the downlink shared channel. In other words, if the previous transmission corresponds to the first transmission, the current transmission may be also performed as the first transmission. Also, if the previous transmission corresponds to the second transmission, the current transmission may be also performed as the second transmission.

Some reasons why the above-mentioned operations should be performed in the case where the power determination is negative (NACK) for the acknowledgement information transmitted in the PUCCH is described in detail below. For example, signals for the acknowledgement information may be embedded in demodulation reference signals in the PUCCH for transmitting the CQI as the multiplexing scheme of the acknowledgement information and the CQI. In this case, it may appear to the base station apparatus that the acknowledgement information is always transmitted independently of whether the mobile station has or has not actually transmitted the acknowledgement information. Thus, the base station apparatus cannot determine whether the mobile station has not received the shared channel or downlink scheduling information successfully. For this reason, the corresponding downlink transmission is determined to be invalid in consideration of unsuccessful reception of downlink scheduling information at the mobile station, and retransmission of the information mapped into downlink shared channels makes it possible to reduce occurrence frequency of events where the mobile station fails to receive the first transmission.

In the case where the power determination is negative (NACK) for the acknowledgement information transmitted in a PUCCH where the acknowledgement information is multiplexed with the CQI, the MAC processing unit 2082 does not always retransmit information mapped into the downlink shared channel as the corresponding downlink transmission being invalid. For the first reception of the NACK, the MAC processing unit 2082 may retransmit the information mapped into the downlink shared channel as the corresponding transmission being invalid. For the next reception of the NACK, the MAC processing unit 2082 may retransmit the information mapped into the downlink shared channel as the corresponding downlink transmission being valid. The fact that the corresponding downlink transmission is valid means that downlink scheduling information is successfully received at a mobile station and signals for the corresponding shared channel is received at the mobile station. For the determination of validity of the corresponding downlink transmission in the NACK reception, only the first NACK may be determined to be invalid and subsequent NACKs may be determined to be valid. Alternatively, odd numbered NACKs may be determined to be invalid while even numbered NACKS may be determined to be valid.

In addition, if a CQI with lower reliability is not transmitted in accordance with CQI reliability determination, the MAC processing unit 2082 may use the previous CQI as the CQI to be transmitted at the current timing.

The RLC processing unit 2083 performs transmission operations in a RLC layer on downlink packet data such as segmentation and concatenation and transmission operations for RLC retransmission control and/or reception operations in the RLC layer on uplink data such as segmentation and concatenation and reception operations for the RLC retransmission control. Also, the RLC processing unit 2083 may further perform operations in a PDCP layer.

[Procedure for Uplink Reception Method]

Next, an exemplary uplink reception method at a base station apparatus is described below. Specifically, three types of uplink reception methods as presented below are described: UL-SCH power determination method (uplink shared channel power determination method), HARQ ACK reception method (Acknowledgement information reception method), and CQI reliability determination method.

(1) UL-SCH Power Determination Method

A transmission determination method (UL-SCH power determination method) according to one embodiment of the present invention is described with reference to FIG. 9.

In the UL-SCH power determination method, after UL scheduling grant (an ID for a user communicating over a PUSCH and transport format information) is transmitted to the mobile station over a PDCCH, power determination is made as to whether the mobile station actually transmits the PUSCH (UL-SCH). In the initial transmission, it is detected whether a detection error of the UL scheduling grant in the PDCCH causes the PUSCH (UL-SCH) not to be transmitted from the mobile station. In retransmissions, it is detected whether erroneous detection of the acknowledgement information NACK to the UL-SCH in the PDCCH as ACK causes the PUSCH (UL-SCH) not to be transmitted from the mobile station UE.

A $SIR_{data}$ is derived from a receive power level $DRSP_{data}$ and an interference wave level $Interference_{data}$ computed based on DM RS (demodulation reference signal) transmitted from the mobile station, $$SIR_{data} = DRSP_{data}/Interferene_{data},$$

where the suffix "data" means that the mobile station makes computation on a frequency band in which the PUSCH (UL-SCH) is transmitted.

An exemplary method of computing the interference wave level $Interference_{data}$ is described in detail below.

The interference wave level may be an instantaneous interference wave level in a relevant subframe or an interference wave level averaged over a longer time period such as 200 ms or 100 ms.

The interference wave level may be computed by averaging variances of demodulation reference signals transmitted from all mobile stations or by averaging variances of demodulation reference signals transmitted from the relevant mobile station. Alternatively, the interference wave level may be computed by averaging variances of sounding reference signals transmitted from all mobile stations or by averaging variances of sounding reference signals transmitted from the relevant mobile station.

Alternatively, the interference wave level may be determined by subtracting the receive power level of the demodulation reference signal from a total uplink receive power level including thermal noise. Also in this case, the interference wave level may be derived from signals transmitted from only the relevant mobile station or by averaging signals transmitted from all mobile stations.

The frequency band to compute the interference wave level may be an exact frequency band in which the PUSCH is transmitted or a frequency band near the frequency band in which the PUSCH is transmitted. Also, the interference wave level during application of hopping is determined as an actual average value of the interference wave levels computed in two frequency bands where the hopping is applied.

Then, the power determination is made based on a DTX threshold $Th_{data}$ and a determination as follows, if $(SIR_{data} < (Th_{data} + \Delta_{data}))$ (S102 in FIG. 9)
"PUSCH (UL-SCH) has not been transmitted" (S106 in FIG. 9),
else
"PUSCH (UL-SCH) has been transmitted" (S104 in FIG. 9), where $\Delta_{data}$ is a transmit power related value for a mobile station, for example, a power difference (power offset) between the sounding reference signal and the PUSCH. The power determination can be made based on the transmit power of the mobile station through the $\Delta_{data}$.

The DTX threshold $Th_{data}$ may be set based on the amount of frequency resources in which the PUSCH is transmitted, that is, the transmit bandwidth or the number of resource blocks. Information on frequency resources in which the PUSCH is transmitted, that is, information on the resource blocks, is transmitted to a mobile station as frequency resource assignment information or resource block assignment information being one information item in the uplink scheduling grant in a PDCCH. For a larger amount of frequency resources, the power determination is achieved with high accuracy but has to be strictly made due to greater significance caused by the erroneous power determination. On the other hand, for a smaller amount of frequency resources, the power determination cannot be achieved with high accuracy but does not have to be strictly made due to less significance caused by the erroneous power determination compared to the larger amount of frequency resources. In order to satisfy the requirement, it is advantageous to determine the DTX threshold $Th_{data}$ based on the amount of frequency resources for the PUSCH, that is, the transmit bandwidth or the number of resource blocks.

If it is determined in the UL-SCH power determination that the PUSCH (UL-SCH) has not been transmitted, the process where non-transmission of the PUSCH (UL-SCH) from the relevant mobile station has been detected is released (S108 in FIG. 9). The term "releasing of process" herein means that it is determined that the mobile station does not transmit the PUSCH (UL-SCH) in that process. In other words, the mobile station determines that it has no data to be retransmitted.

In addition, retransmission resources to be assigned to the PUSCH are released at the same time. The term "releasing of resources" herein means that these resources are assigned to uplink shared channels for other mobile stations or that the resources are assigned to uplink shared channels to be newly transmitted for the relevant mobile station. Also, since synchronous HARQ is used in uplinks in accordance with the Evolved UTRA and UTRAN, uplink shared channels are transmitted from the relevant mobile station to a base station apparatus at predefined timings until the uplink shared channels are successfully received or until the maximum number of retransmission is reached. If it is determined that the mobile station $100_n$ has not actually transmitted the uplink shared channels, retransmission resources are released in all subsequent subframes to be retransmitted for the uplink shared channels.

Furthermore, at the same time (S108 in FIG. 9), the base station apparatus may transmit a positive response ACK to the relevant mobile station as acknowledgement information to the PUSCH (UL-SCH) determined as not being transmitted in the UL-SCH power determination. Some effects of the transmission of the ACK to the mobile station is described below. If a determination error occurs in the UL-SCH power determination, that is, if the mobile station has actually transmitted the PUSCH (UL-SCH) but the base station apparatus has determined that the PUSCH has not been transmitted, the mobile station continues on retransmissions, and on the other hand, the base station apparatus may assign resource blocks for the retransmissions from the mobile station to new transmissions for other mobile stations. In this case, the retransmissions from the mobile station conflict with the new transmissions from the other mobile stations, and thus both characteristics of the retransmissions from the mobile station and the new transmissions from the other mobile stations may be significantly degraded. As stated above, if the positive response ACK is transmitted as the acknowledgement information to the PUSCH (UL-SCH) determined as not being transmitted, the mobile station stops the retransmission regardless of the actual transmissions of the PUSCH (UL-SCH), and thus the above-mentioned conflict may not occur.

(2) HARQ ACK Reception Method

An acknowledgement information determination method (HARQ ACK reception method) according to one embodiment of the present invention is described with reference to FIG. 10.

A HARQ-ACK for the DL-SCH (acknowledgement information for a downlink shared channel) is mapped into a PUCCH frequency-multiplexed with a PUSCH as illustrated in FIG. 2. A determination of three values is made for the HARQ-ACK for the DL-SCH (acknowledgement information for downlink shared channels) in accordance with methods as presented below.

(2-1) Case of Transmission of Only ACK

A $SIR_{ACK}$ is derived from a receive power level $DRSP_{ACK}$ for a demodulation reference signal in a relevant subframe and an interference wave level $Interference_{ACK}$ computed based on DM RS (demodulation reference signal) transmitted from the relevant mobile station, $$SIR_{ACK1} = DRSP_{ACK}/Interference_{ACK},$$

where the suffix "ACK1" means that the SIR, the receive level for the demodulation reference signal and the interference wave level are derived for a signal to transmit acknowledgement information to a downlink shared channel from the mobile station.

An exemplary method of computing the interference wave level $Interference_{ACK}$ is described in detail below.

The interference wave level may be an instantaneous interference wave level in the relevant subframe or an interference wave level averaged over a longer time period such as 200 ms or 100 ms.

The interference wave level may be computed by averaging variances of demodulation reference signals transmitted from all mobile stations or by averaging variances of demodulation reference signals transmitted from the relevant mobile station.

Alternatively, the interference wave level may be determined by subtracting the receive power level of the demodulation reference signal from a total uplink receive power level including thermal noise. Also in this case, the interference wave level may be derived from signals transmitted from only the relevant mobile station or by averaging signals transmitted from all mobile stations.

The frequency band to compute the interference wave level may be an exact frequency band in which a PUCCH is transmitted or a frequency band near the frequency band in which the PUCCH is transmitted. Also, the interference wave level during application of hopping is determined as an actual average value of the interference wave levels computed in two frequency bands where the hopping is applied.

Then, the three values (ACK/NACK/DTX) determination is made based on a DTX threshold $Th_{DTX\_ACK1}$ and a determination as follows, if ($SIR_{ACK1} < Th_{DTX\_ACK1}$) (S202 in FIG. 10)
"DTX has been transmitted" (S206 in FIG. 10),
else
"ACK or NACK has been transmitted" (S204 in FIG. 10), where the determination of ACK/NACK is made from signs of a signal sequence of the HARQ-ACK for a downlink (acknowledgement information of a downlink shared channel).

If it is determined that the DTX has been transmitted, the base station apparatus retransmits a downlink shared channel (S208 in FIG. 10). For example, the base station apparatus may determine that the mobile station $100_n$ fails to receive not a shared channel but downlink scheduling information in the accompanying PDCCH. In this case, the base station apparatus may determine the previous transmission to be invalid and retransmit information mapped into a downlink shared channel. In other words, if the previous transmission is the first one, the current transmission is processed as the first transmission. If the previous transmission is the second one, the current transmission may be also handled as the second one.

(2-2) Case where ACK is Multiplexed with CQI, Scheduling Request and/or Release Request A $SIR_{ACK+CQI}$ is derived from a receive power level $DRSP_{ACK+CQI}$ for a demodulation reference signal in a relevant subframe and an interference wave level $Interference_{CQI}$ computed based on DM RS (demodulation reference signal) transmitted from the relevant mobile station, $$SIR_{ACK+CQI} = DRSP_{ACK+CQI}/Interference_{CQI},$$

where the suffixes "ACK+CQI" and "CQI" mean that the SIR, the receive level for the demodulation reference signal and the interference wave level are derived for a signal transmitted from the mobile station where acknowledgement information is multiplexed with the CQI.

An exemplary method of computing the interference wave level $Interference_{CQI}$ is described in detail below.

The interference wave level may be an instantaneous interference wave level in the relevant subframe or an interference wave level averaged over a longer time period such as 200 ms or 100 ms.

The interference wave level may be computed by averaging variances of demodulation reference signals transmitted from all mobile stations or by averaging variances of demodulation reference signals transmitted from the relevant mobile station.

Alternatively, the interference wave level may be determined by subtracting the receive power level of the demodulation reference signal from a total uplink receive power level including thermal noise. Also in this case, the interference wave level may be derived from signals transmitted from only the relevant mobile station or by averaging signals transmitted from all mobile stations.

The frequency band to compute the interference wave level may be an exact frequency band in which a PUCCH is transmitted or a frequency band near the frequency band in which the PUCCH is transmitted. Also, the interference wave level during application of hopping is determined as an actual average value of the interference wave levels computed in two frequency bands where the hopping is applied.

Then, the three values (ACK/NACK/DTX) determination is made based on a DTX threshold $Th_{DTX\_ACK+CQI}$ and a determination as follows, if ($SIR_{ACK+CQI} < Th_{DTX\_ACK+CQI}$) (S202 in FIG. 10)
"DTX has been transmitted" (S206 in FIG. 10),
else
"ACK or NACK has been transmitted" (S204 in FIG. 10), where the determination of ACK/NACK is made from signs of a signal sequence of the HARQ-ACK for a downlink (acknowledgement information of a downlink shared channel).

In addition to the above-mentioned transmission together with the multiplexed CQI, the HARQ-ACK for DL-SCH (acknowledgement information to a downlink shared channel) may be transmitted in such a manner that it is multiplexed with the CQI and scheduling request or in such a manner that it is multiplexed with the CQI and release request. In any of the manners, the DTX threshold $Th_{DTX\_ACK+CQI+SR}$ and $TH_{DTX\_ACK+CQI+RR}$ may be used for the determination.

If it is determined that the DTX has been transmitted, the base station apparatus retransmits a downlink shared channel (S208 in FIG. 10). For example, the base station apparatus may determine that the mobile station $100_n$ fails to receive not a shared channel but downlink scheduling information in the accompanying PDCCH. In this case, the base station apparatus may determine the previous transmission to be invalid and retransmit information mapped into a downlink shared channel. In other words, if the previous transmission is the first one, the current transmission is processed as the first transmission. If the previous transmission is the second one, the current transmission may be also handled as the second one.

The above-mentioned HARQ ACK reception method in the case where the ACK is multiplexed with the CQI may be applied to the case where the ACK and the CQI are encoded together (Joint Coding applied case) or to the case where the ACK and the CQI are separately encoded (Separate Coding applied case).

Alternatively, the base station apparatus may be configured not to perform the above-mentioned ACK/NACK/DTX determination (three values determination) in the case where the ACK is multiplexed with the CQI. For example, a signal for the above-mentioned acknowledgement information may be embedded in a demodulation reference signal in a PUCCH to transmit the CQI as a method of multiplexing the acknowledgement information with the CQI. In this case, it appears to the base station apparatus that the acknowledgement information is always transmitted independently of whether the mobile station actually transmits the acknowledgement information. Thus, the base station apparatus would not perform the above-mentioned ACK/NACK/DTX determination (three values determination) in the case where the ACK is multiplexed with the CQI.

(3) CQI Reliability Determination Method

The CQI reliability determination method is performed in accordance with three steps as presented below.

The CQI reliability determination is made under the case where the CQI is mapped into a PUCCH frequency-multiplexed with a PUSCH as illustrated in FIG. 2.

Step 1:

Obtain a received bit sequence z[n] (n is a bit index) for the CQI. It is assumed that the number of bits for the CQI transmitted in one subframe is equal to N. The number N depends on the presence of other information elements (acknowledgement information, scheduling request and release request) multiplexed with the CQI (S302 in FIG. 11).

Step 2:

Obtain 32 different correlation values in accordance with a formula as presented below (S304 in FIG. 11), where it is assumed that the number of information bits for the CQI transmitted in one subframe is equal to 5.

The number of information bits for the CQI may be any other value. For example, the number of information bits for the CQI may be equal to four.

$$z_{corr}(i) = \frac{1}{N} \cdot \sum_{n=1}^{N} z[n] \cdot S[n],$$

where s[n] represents CQI code word bits, and i represents a CQI index.

Step 3:

Perform power determination based on the $SIR_{CQI}$ for the maximum $z_{corr}(i)$ (referred to as $MAX[z_{corr}(i)]$ hereinafter) and a formula as presented below (S306 in FIG. 11), if ($SIR_{CQI} < Th_{CQI}$) "No_Code_Word_Detected" (S308 in FIG. 11)

else "Code_Word_Detected" (S312 in FIG. 11), where it is assumed that $SIR_{CQI} = \{MAX[z_{corr}(i)]\}^2 / Interference_{CQI}$. The parameter $Interference_{CQI}$ is the same as $Interference_{CQI}$ under the above-mentioned case (2-2) where the ACK is multiplexed with the CQI, scheduling request and release request.

If it is determined that "No_Code_Word_Detected" holds, it is determined that the reliability of the CQI is extremely low, and the less reliable CQI is not used in the scheduling and AMC operations (S310 in FIG. 11). On the other hand, if it is determined that "Code_Word_Detected" holds, it is determined the CQI is highly reliable, and the reliable CQI is used in the scheduling and AMC operations (S314 in FIG. 11).

In the above-mentioned embodiment, the SIR for the received bit sequence for the CQI in the PUCCH into which the CQI is mapped is used, but the SIR for a data demodulation reference signal in the PUCCH into which the CQI is mapped may be used.

[Procedure for Acknowledgement Information Reception Method for Downlink Shared Channels]

Figure 12:
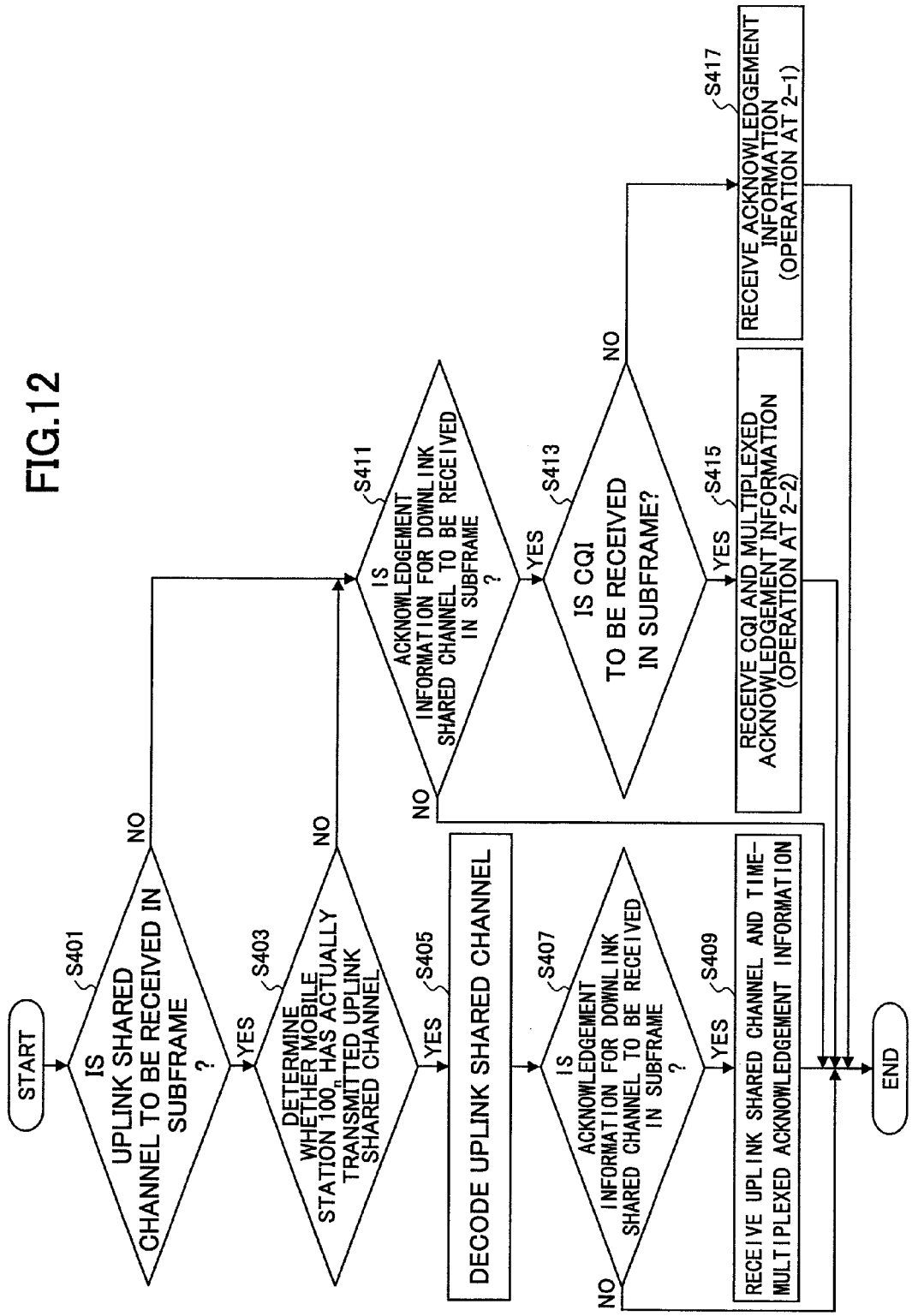
FIG. 12 is a flowchart illustrating an acknowledgement information reception method according to one embodiment of the present invention.

An exemplary reception method of acknowledgement information to downlink shared channels at a base station apparatus is described with reference to FIGS. 12 and 13. The acknowledgement information to downlink shared channels is transmitted in uplinks.

It is assumed below that if the acknowledgement information to downlink shared channels and CQI are mapped into a PUCCH at both ends of a system band, resources are divided into resources into which only the acknowledgement information to downlink shared channels is mapped (referred to as resource A hereinafter) and resources where the CQI or the CQI and the acknowledgement information to downlink shared channels are multiplexed (referred to as resource B hereinafter). In other words, if a mobile station does not transmit uplink shared channels, the mobile station uses resources A to transmit only the acknowledgement information to downlink shared channels and uses resources B to transmit the CQI or the multiplexed CQI and acknowledgement information to downlink shared channels. In the transmissions of the CQI, if scheduling request or release request are multiplexed and transmitted in addition to the ACK, resources B are used.

In exemplary resource assignment illustrated in FIG. 13, if a subframe is assumed to be for a mobile station to transmit the acknowledgement information, resource #2 in resources A is defined as a resource assigned to the mobile station for the acknowledgement information. For example, the resource may have one-to-one correspondence to a resource number for a downlink shared channel corresponding to the acknowledgement information or a resource number for a downlink control channel (DL scheduling information) corresponding to the acknowledgement information. Resource #n+3 in resources B is defined as a resource assigned to the mobile station for the CQI if a relevant subframe is assumed to be for the mobile station to transmit the CQI. The resource numbers n and m are any natural numbers.

The resources may be frequency resources, code resources or a combination of the frequency resources and the code resources. Alternatively, the resources may be multiplexed in accordance with block spreading, temporal resources or a combination of the frequency resources and the code resources. In other words, the resources are defined depending on multiplexing methods for multiplexing the acknowledgement information to downlink shared channels and the CQI in PUCCHs. If the multiplexing method relates to CDMA, the resources consist of code resources. If the multiplexing method relates to FDMA, the resources consist of frequency resources. If the multiplexing method relates to a combination of CDMA and FDMA, the resources consist of a combination of the code resources and the frequency resources. Also, Walsh code multiplexing, CAZAC sequence code multiplexing and/or others may be applied in the CDMA.

The acknowledgement information to downlink shared channels may be time-multiplexed with uplink shared channels or mapped into PUCCHs at both ends of a system band. Furthermore, in the case where the acknowledgement information to downlink shared channels is mapped into PUCCHs at both ends of the system band, the acknowledgement information may be multiplexed with the CQI (the above-mentioned case (2-2)) or may not be multiplexed with the CQI (the above-mentioned case (2-1). An exemplary procedure at a base station apparatus of determining these cases and receiving the acknowledgement information is described below.

At step S401, the base station apparatus determines whether an uplink shared channel is to be received in a relevant subframe. Specifically, the base station apparatus determines to receive the uplink shared channel if the base station apparatus has transmitted scheduling grant to a mobile station and does not determine to receive the uplink shared channel otherwise. More specifically, in FIG. 5, subframe #i+3 corresponds to a subframe where the uplink shared channel is to be received, and subframes other than subframe #i+3 correspond to subframes where the uplink shared channel is not to be received. In another example, in FIG. 6, subframes #i+3 and #i+9 correspond to subframes where the uplink shared channel is to be received, and subframes other than subframes #i+3 and #i+9 correspond to subframes where the uplink shared channel is not to be received. Even in the case where the UL scheduling grant has not been transmitted to the mobile station, as illustrated in subframe #i+9 in FIG. 9, if NACK has been transmitted as the acknowledgement information to uplink shared channels, a subframe at the corresponding retransmission timing would be a subframe where the uplink shared channel is to be received. In other words, if the uplink scheduling grant was transmitted in a subframe preceding a relevant subframe by a predefined number of subframes over a PDCCH or if NACK was transmitted as the acknowledgement information to uplink shared channels in a subframe preceding the relevant subframe by a predefined number of subframes over a PDCCH, the relevant subframe would be a subframe where the uplink shared channel is to be received.

If the uplink shared channel is to be received at the relevant subframe (S401: YES), at step S403, the base station apparatus determines whether the mobile station $100_n$ has actually transmitted the uplink shared channel. If the base station apparatus determines that the mobile station $100_n$ has actually transmitted the uplink shared channel (S403: YES), at step S405, the base station apparatus decodes the uplink shared channel. At step S407, the base station apparatus determines whether to receive acknowledgement information to downlink shared channels in the relevant subframe. If the base station apparatus is to receive the acknowledgement information (S407: YES), at step S409, the base station apparatus receives the acknowledgement information time-multiplexed with the uplink shared channel. If the base station apparatus is not to receive the acknowledgement information (S407: NO), the base station apparatus does not receive the acknowledgement information.

On the other hand, if the base station apparatus is not to receive the uplink shared channel in the relevant subframe (S401: NO) or if the base station apparatus does not determine that the mobile station $100_n$ has actually transmitted the uplink shared channel (S403: NO), the base station apparatus checks the PUCCH mapped into both ends of the system band. To this end, at step S411, the base station apparatus determines whether to receive the acknowledgement information to downlink shared channel in the relevant subframe. More specifically, in FIG. 7, subframe #i+3 corresponds to a subframe where the acknowledgement information to downlink shared channels is to be received, and subframes other than subframe #i+3 correspond to subframes where the acknowledgement information to downlink shared channels is not to be received. In other words, if the downlink scheduling information was transmitted in a subframe preceding the relevant subframe by a predefined number of subframes over a PDCCH, the relevant subframe would be a subframe where the acknowledgement information to downlink shared channels is to be received.

If the base station apparatus is not to receive the acknowledgement information (S411: NO), the base station apparatus does not receive the acknowledgement information. On the other hand, if the base station apparatus is to receive the acknowledgement information (S411: YES), at step S413, the base station apparatus determines whether to receive the CQI in the relevant subframe. If the base station apparatus is to receive the CQI (S413: YES), at step S415, the base station apparatus receives the acknowledgement information multiplexed with the CQI mapped into resources B (resource #n+3) in accordance with the above-mentioned case (2-2) where ACK is multiplexed with the CQI, scheduling request or release request. On the other hand, if the base station apparatus is not receive the CQI (S413: NO), at step S417, the base station apparatus receives the acknowledgement information mapped into resources A (resource #2) in accordance with the above-mentioned case (2-1) where only ACK is transmitted.

[Procedure for Uplink CQI Reception Method]

An exemplary method for receiving uplink CQI at a base station apparatus is described with reference to FIG. 14.

A CQI may be time-multiplexed with uplink shared channels or mapped into a PUCCH at both ends of a system band. Furthermore, in the case where the CQI is mapped into the PUCCH at both ends of the system band, the CQI may be multiplexed with acknowledgement information or may not be multiplexed with the acknowledgement information. The base station apparatus may determine these cases and receive the CQI as follows.

At step S501, the base station apparatus determines whether to receive an uplink shared channel in a relevant subframe. Specifically, if the base station apparatus transmits scheduling grant to a mobile station, the base station apparatus determines that it is to receive the uplink shared channel. On the other hand, if the base station apparatus has not transmitted the scheduling grant to the mobile station, the base station apparatus determines that it is not to receive the uplink shared channel. More specifically, in FIG. 5, subframe #i+3 corresponds to a subframe where the uplink shared channel is to be received, and subframes other than subframe #i+3 correspond to subframes where the uplink shared channel is not to be received. Alternatively, in FIG. 6, subframes #i+3 and #i+9 correspond to subframes where the uplink shared channel is to be received, and subframes other than subframes #i+3 and #i+9 correspond to subframes where the uplink shared channel is not to be received. Even in the case where UL scheduling grant has not been transmitted to the mobile station, as illustrated in subframe #i+9 in FIG. 9, if NACK has been transmitted as acknowledgement information to the uplink shared channel, a subframe corresponding to its retransmission timing would be to be received in the uplink shared channel. In other words, if the uplink scheduling grant was transmitted in a subframe preceding the relevant subframe by a predefined number of subframes or if NACK was transmitted as the acknowledgement information to the uplink shared channel in a subframe preceding the relevant subframe by a predefined number of subframes over a PDCCH, the relevant subframe would be to be received in the uplink shared channel.

If the base station apparatus is to receive the uplink shared channel in the relevant subframe (S501: YES), at step S503, the base station apparatus determines whether the mobile station $100_n$ has actually transmitted the uplink shared channel in accordance with FIG. 9. If the base station apparatus determines that the mobile station $100_n$ has actually transmitted the uplink shared channel (S503: YES), at step S505, the base station apparatus decodes the uplink shared channel. Then, at step S507, the base station apparatus determines whether to receive a CQI in the relevant subframe. If the base station apparatus is to receive the CQI (S507: YES), at step S509, the base station apparatus receives the CQI time-multiplexed with the uplink shared channel. In other embodiments, at step S509, the base station apparatus may determine the reliability of the CQI in accordance with FIG. 11. If the base station apparatus is not to receive the CQI (S507: NO), the base station apparatus does not receive the CQI.

On the other hand, if the base station apparatus is not to receive the uplink shared channel in the relevant subframe (S501: NO) or if the base station apparatus does not determine that the mobile station $100_n$ has actually transmitted the uplink shared channel (S503: NO), the base station apparatus checks a PUCCH mapped into both ends of a system band. To this end, at step S511, the base station apparatus determines whether to receive a CQI in the relevant subframe. If the base station apparatus is not to receive the CQI (S511: NO), the base station apparatus does not receive the CQI. On the other hand, if the base station apparatus is to receive the CQI (S511: YES), at step S513, the base station apparatus determines whether to receive acknowledgement information to a downlink shared channel in the relevant subframe. More specifically, in FIG. 7, subframe #i+3 corresponds to a subframe where the acknowledgement information to the downlink shared channel is to be received, and subframes other than subframe #i+3 correspond to subframes where the acknowledgement information to the downlink shared channel is not to be received. In other words, if downlink scheduling information was transmitted in a subframe preceding the relevant subframe by a predefined number of subframes over a PDCCH, the relevant subframe would be a subframe for receiving the acknowledgement information to the downlink shared channel.

If the base station apparatus is not to receive the acknowledgement information (S513: NO), at step S519, the base station apparatus receives the CQI mapped into resources B (resource #n+3) in the PUCCH. On the other hand, if the base station apparatus is to receive the acknowledgement information (S513: YES), at step S515, the base station apparatus determines whether a mobile station has actually transmitted the acknowledgement information in resources B (resource #n+3) in accordance with the above-mentioned case (2-2) where the ACK is multiplexed with the CQI, scheduling request or release request. If the base station apparatus determines that the mobile station has actually transmitted the acknowledgement information (S515: YES), at step S517, the base station apparatus receives the CQI multiplexed with the acknowledgement information in resources B (resource #n+3) in the PUCCH. If the base station apparatus determines that the mobile station has not transmitted the acknowledgement information (S515: NO), at step S519, the base station apparatus receives the CQI mapped into resources B (resource #n+3) in the PUCCH.

In this embodiment, at step S515, the base station apparatus determines that the mobile station has actually transmitted the acknowledgement information in resources B (resource #n+3). In other embodiments, at step S515, the base station apparatus may always determine that the mobile station has actually transmitted the acknowledgement information. For example, a signal for the acknowledgement information may be embedded in a demodulation reference signal in the PUCCH for transmitting the CQI in order to multiplex the acknowledgement information with the CQI. In this case, it appears to the base station apparatus that the acknowledgement information is always transmitted independently of whether the mobile station has actually transmitted the acknowledgement information. Thus, at step S515, the base station apparatus would always determine that the mobile station has actually transmitted the acknowledgement information.

In this manner, according to the embodiments of the present invention, the base station apparatus can be achieved for appropriate scheduling and HARQ operations in uplinks and downlinks in LTE.

In the above-mentioned embodiments, it has been assumed that RRT (Round Trip Time) for HARQ in uplinks and downlinks is equal to 6, but the present invention is not limited to the RRT value. For example, apparatuses and operations according to embodiments of the present invention may be applied to RTT equal to 8 in uplink and downlink HARQ.

Although the present invention has been described by way of the above specific embodiments, the present invention is not limited to them. Various alternative embodiments, implementations and operations will be conceived by those skilled in the art from this disclosure.

In other words, it is understood that the present invention encompasses other embodiments not disclosed herein. Thus, the scope of the present invention can only be defined via accompanying claims.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Applications No. 2007-052112 filed on Mar. 1, 2007 and No. 2007-121301 filed on May 1, 2007, the entire contents of which are hereby incorporated by reference.

The invention claimed is:

1. A base station apparatus for communicating to a mobile station over an uplink shared channel, comprising:
 a transmit instruction unit configured to assign an uplink shared channel to the mobile station and instruct the mobile station to conduct transmissions over the assigned uplink shared channel;
 a measurement unit configured to measure a radio quality of the assigned uplink shared channel;
 a determination unit configured to determine based on the radio quality whether the mobile station has actually transmitted data in a subframe to be used by the mobile station to transmit the uplink shared channel; and an ACK transmission unit configured to transmit a positive response (ACK) for acknowledgement information to the mobile station if it is determined that the mobile station has not actually transmitted data in the subframe to be used by the mobile station to transmit the uplink shared channel.

2. The base station apparatus as claimed in claim 1, wherein the transmit instruction unit is configured to instruct the mobile station to conduct transmissions over the assigned uplink shared channel by transmitting an uplink scheduling grant or negative response (NACK) as acknowledgement information.

3. The base station apparatus as claimed in claim 1, wherein the radio quality includes at least one of a ratio between a receive power level for a data demodulation reference signal in the uplink shared channel and an interference power level and a ratio between a receive power level for a data signal in the uplink shared channel and an interference power level.

4. The base station apparatus as claimed in claim 1, wherein if the radio quality is lower than or equal to a predefined threshold, the determination unit is configured to determine that the mobile station has not transmitted data over the assigned uplink shared channel.

5. The base station apparatus as claimed in claim 4, wherein the threshold is determined based on at least one of a power difference between the uplink shared channel and a sounding reference signal, an amount of frequency resources for the uplink shared channel, a MCS level for the uplink shared channel, a modulation scheme for the uplink shared channel and a transmit power level for the uplink shared channel.

6. The base station apparatus as claimed in claim 5, wherein the threshold is increased if the power difference is greater, and the threshold is decreased if the power difference is smaller.

7. The base station apparatus as claimed in claim 5, wherein the threshold is increased if the amount of frequency resources for the uplink shared channel is larger, and the threshold is decreased if the amount of frequency resources for the uplink shared channel is smaller.

8. The base station apparatus as claimed in claim 1, further comprising:

a resource management unit configured to release a retransmission resource for the uplink shared channel assigned to the mobile station if it is determined that the mobile station has not actually transmitted data in the subframe to be used by the mobile station to transmit the uplink shared channel.

9. A communication control method at a base station apparatus for communicating to a mobile station over an uplink shared channel, the method comprising:

assigning an uplink shared channel to the mobile station and instructing the mobile station to conduct transmissions over the assigned uplink shared channel;

measuring a radio quality of the uplink shared channel assigned to the mobile station;

determining based on the radio quality whether the mobile station has actually transmitted data in a subframe to be used by the mobile station to transmit the uplink shared channel, transmitting a positive response (ACK) for acknowledgement information to the mobile station if it is determined that the mobile station has not actually transmitted data in the subframe to be used by the mobile station to transmit the uplink shared channel.

* * * * *